United States Patent
Stapf et al.

(10) Patent No.: US 12,180,398 B2
(45) Date of Patent: Dec. 31, 2024

(54) ONE COMPONENT (1K) CURABLE ADHESIVE COMPOSITION

(71) Applicant: Henkel AG & Co. KGaA, Duesseldorf (DE)

(72) Inventors: Stefanie Stapf, Essen (DE); Alexandra Lieske, Duesseldorf (DE); Jordan Gutierrez Diaz, Duesseldorf (DE); Thomas Moeller, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 164 days.

(21) Appl. No.: 17/838,835

(22) Filed: Jun. 13, 2022

(65) Prior Publication Data
US 2022/0411673 A1   Dec. 29, 2022

Related U.S. Application Data

(63) Continuation of application No. PCT/EP2020/083108, filed on Nov. 24, 2020.

(30) Foreign Application Priority Data

Dec. 13, 2019   (EP) .................................. 19216097

(51) Int. Cl.
```
C09J 9/02      (2006.01)
B32B 7/12      (2006.01)
B32B 15/20     (2006.01)
B32B 43/00     (2006.01)
C09J 5/00      (2006.01)
C09J 11/04     (2006.01)
C09J 11/06     (2006.01)
C09J 11/08     (2006.01)
C09J 163/00    (2006.01)
```
(52) U.S. Cl.
CPC .................. *C09J 9/02* (2013.01); *B32B 7/12* (2013.01); *B32B 15/20* (2013.01); *B32B 43/006* (2013.01); *C09J 5/00* (2013.01); *C09J 11/04* (2013.01); *C09J 11/06* (2013.01); *C09J 11/08* (2013.01); *C09J 163/00* (2013.01); *B32B 2310/021* (2013.01); *B32B 2311/24* (2013.01); *C09J 2463/00* (2013.01)

(58) Field of Classification Search
USPC ......................................................... 528/86
See application file for complete search history.

(56) References Cited

U.S. PATENT DOCUMENTS

| | | | |
|---|---|---|---|
| 6,620,308 B2 | 9/2003 | Gilbert |
| 7,332,218 B1 | 2/2008 | Gilbert |
| 7,465,492 B2 | 12/2008 | Gilbert |
| 2007/0269659 A1 | 11/2007 | Gilbert |
| 2008/0196828 A1 | 8/2008 | Gilbert |
| 2008/0283415 A1 | 11/2008 | Gilbert |
| 2009/0035580 A1 | 2/2009 | Chino et al. |
| 2010/0000878 A1 | 1/2010 | Gilbert |

FOREIGN PATENT DOCUMENTS

| | | |
|---|---|---|
| DE | 102005050632 | 5/2007 |
| EP | 1200252 | 9/2006 |
| JP | 2015196793 | 11/2015 |
| JP | 2016079313 A | 5/2016 |
| WO | 2007018239 | 2/2007 |

OTHER PUBLICATIONS

PCT International Search Report issued in connection with International Application No. PCT/EP2020/083108 Mailing date: Feb. 5, 2021.
Leijonmarck et al., "Electrochemical Characterization of Electrically Induced Adhesive Debonding"; Journal of The Electrochemical Society, 158 (10) P109-114 (2011).
Sotta et al., "Application of electrochemical impedance spectroscopy to the study of ionic transport in polymer-based electrolytes"; Progress in Organic Coatings 69, p. 207-214 (2010).
Leijonmarck et al., "Electrolytically assisted debonding of adhesives: An experimental investigation"; International Journal of Adhesion & Adhesives 32 p. 39-45 (2012).
Huang Changgan et al.. Organic Synthetic Chemistry, Hefei University of Technology Press, p. 240 (2017) English language machine translation.
Dai Songyuan et al., Key Science and Technology of Thin Film Solar Cells, Shanghai Scientific & Technical Publishers, pp. 264-267 (2013) English language machine translation.

*Primary Examiner* — Terressa Boykin
(74) *Attorney, Agent, or Firm* — Steven C. Bauman

(57) ABSTRACT

The present invention is directed to a curable and one component (1K) debondable adhesive composition comprising: a) epoxy resin; b) a curing agent for said epoxy resin; c) an electrolyte; and, d) an electrically non-conductive filler; wherein said composition comprises at least one of: e) a combination of a solubilizer and a toughener; and, f) electrically conductive particles.

19 Claims, 6 Drawing Sheets

ONE COMPONENT (1K) CURABLE ADHESIVE COMPOSITION

FIELD OF THE INVENTION

The present invention is directed to an adhesive composition which can be debonded from particular substrates to which it is applied. More particularly, the present invention is directed to a one-part (1K) curable and debondable adhesive composition.

BACKGROUND TO THE INVENTION

Adhesive bonds and polymeric coatings are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue and seal the joints from corrosive species.

Whilst adhesive bonds thus offer many advantages over mechanical fasteners, it tends to be difficult to disassemble adhesively bonded objects where this is required in practical applications. The removal of the adhesive through mechanical processes—such as by sand blasting or by wire brushing—is often precluded, in part because the adhesive is disposed between substrates and is thus either inaccessible or difficult to abrade without corrupting the substrate surfaces. Disassembly through the application of chemicals and/or high temperature—such as disclosed in U.S. Pat. No. 4,171,240 (Wong) and U.S. Pat. No. 4,729,797 (Linde et al.)—might be effective but can be time consuming and complex to perform: moreover, the aggressive chemicals and/or harsh conditions required can damage the substrates being separated, rendering them unsuitable for subsequent applications.

Noting these problems, certain authors have sought to develop debondable adhesive compositions, wherein the passage of an electrical current through the cured compositions acts to disrupt the bonding at the interface of the adhesive and the substrate.

U.S. Pat. No. 7,465,492 (Gilbert) describes an electrochemically disbondable composition comprising: a matrix functionality comprising a monomer selected from the group consisting of acrylics, methacrylics and combinations thereof; a free radical initiator; and, an electrolyte, wherein the electrolyte provides sufficient ionic conductivity to said composition to support a faradaic reaction at a bond formed between the composition and an electrically conductive surface and thus allows the composition to disbond from the surface.

US 2007/0269659 (Gilbert) describes an adhesive composition disbondable at two interfaces, the composition: (i) comprising a polymer and an electrolyte; (ii) facilitating joinder of two surfaces; and, (iii) in response to a voltage applied across both surfaces so as to form an anodic interface and a cathodic interface, disbonding from both the anodic and cathodic surfaces.

US 2008/0196828 (Gilbert) describes a hot-melt adhesive composition comprising: a thermoplastic component; and, an electrolyte, wherein the electrolyte provides sufficient ionic conductivity to the composition to enable a faradaic reaction at a bond formed between the composition and an electrically conductive surface and to allow the composition to disbond from the surface.

WO2017/133864 (Henkel AG & Co. KGaA) describes a method for reversibly bonding a first and a second substrate, wherein at least the first substrate is an electrically non-conductive substrate, the method comprising: a) coating the surface of the electrically non-conductive substrate(s) with a conductive ink; b) applying an electrically debondable hot melt adhesive composition to the conductive ink-coated surface of the first substrate and/or the second substrate; c) contacting the first and the second substrates such that the electrically debondable hot melt adhesive composition is interposed between the two substrates; d) allowing formation of an adhesive bond between the two substrates to provide bonded substrates; and, e) applying a voltage to the bonded substrates whereby adhesion at at least one interface between the electrically debondable hot melt adhesive composition and a substrate surface is substantially weakened.

There remains a need in the art to provide an adhesive composition which can be conveniently applied to the surfaces of substrates to be bonded, which upon curing thereof can provide an effective bond within composite structures containing said substrates but which can be effectively de-bonded from those substrates by the facile application of an electrical potential across the cured adhesive.

STATEMENT OF THE INVENTION

In accordance with a first aspect of the invention there is provided a one part (1K) curable and debondable adhesive composition
  i) epoxy resin;
  ii) a curing agent for said epoxy resin;
  iii) an electrolyte; and,
  iv) an electrically non-conductive filler;
wherein said composition comprises at least one of:
  v) e) a combination of a solubilizer and a toughener; and,
  vi) f) electrically conductive particles.

In important embodiments of the invention, the one component (1K) debondable adhesive composition comprises, based on the total weight of the composition:
  i) from 15 to 75 wt. %, preferably from 20 to 65 wt. % of
    a) said epoxy resin;
  ii) from 0.01 to 25 wt. %, preferably from 0.1 to 23 wt.
    % of b) said curing agent for said epoxy resin;
  iii) from 2.0 to 25 wt. %, preferably from 3 to 20 wt % of
    c) said electrolyte; and,
  iv) from 1 to 50 wt. %, preferably from 1.5 to 48 wt. %
    of d) said electrically non-conductive filler,
wherein, when said adhesive composition comprises said combination of solubilizer and toughener, the composition comprises:
  v) from 1 to 15 wt. %, preferably from 2 to 10 wt. % of
    solubilizer;
  vi) from 5 to 40 wt. %, preferably from 10 to 25 wt. % of
    toughener; and,
further wherein, when said adhesive composition comprises said electrically conductive particles, the composition comprises from 0.1 to 5 wt. %, preferably from 0.5 to 4 wt. % of f) said electrically conductive particles.

In some embodiments, the curing agent comprises or consists of a thiol-based curing agent selected from the group consisting of tris-(3-mercaptopropionate) (TMP), pentaerythritoltetra(3-mercaptopropionate), di-pentaerythritolhexa(3-mercaptopropionate), pentaerythritoltetra(3-mercaptopropionate), tris(2-(mercaptopropionyloxy)ethyl)isocyanate and mixtures thereof. A preference may be noted for the use of tris-(3-mercaptopropionate) in this regard.

Independently, the curing agent may comprise or consist of an amine-based curing agent, preferably selected from the group consisting of cycloaliphatic amines, aliphatic amines, dicyanodiamides, polyether amines and mixtures thereof. In this regard, a preference for the use of polyether amines, dicyanodiamides, and mixtures thereof may be mentioned.

In accordance with a second aspect of the invention, there is provided a bonded structure comprising:
- a first material layer having an electrically conductive surface; and,
- a second material layer having an electrically conductive surface, wherein the cured debondable one-part (1K) adhesive composition as defined hereinabove and in the appended claims is disposed between said first and second material layers.

In accordance with a third aspect of the present invention, there is provided a method of debonding said bonded structure as defined hereinabove and in the appended claims, the method comprising the steps of:
- i) applying a voltage across both surfaces to form an anodic interface and a cathodic interface; and,
- ii) debonding the surfaces.

Step i) of this method is preferably characterized by at least one of:
- i) an applied voltage of from 0.5 to 200 V; and,
- ii) the voltage being applied for a duration of from 1 second to 120 minutes, preferably from 1 second to 60 minutes.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0 to x" specifically includes 0 wt. %: the ingredient defined by said range may be absent from the composition or may be present in the composition in an amount up to x wt. %.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

As used herein the term "debondable" means that, after curing of the adhesive, the bond strength can be weakened by at least 50% upon application of an electrical potential of from 10V-75V for a duration of from 1 s to 60 minutes. The cured adhesive is applied between two substrates which are bonded by said adhesive so that an electric current is running through the adhesive bond line. Bond strength is measured by Tensile Lap Shear (TLS) test performed at room temperature and based upon EN 1465:2009 (German version) *Based on Adhesives—Determination of tensile lap-shear strength of bonded assemblies*. The bond overlapping area was 25 mm×10 mm with a bond thickness of about 150 μm.

As used herein, the term "monomer" refers to a substance that can undergo a polymerization reaction to contribute constitutional units to the chemical structure of a polymer. The term "monofunctional", as used herein, refers to the possession of one polymerizable moiety. The term "polyfunctional", as used herein, refers to the possession of more than one polymerizable moiety.

As used herein, the term "equivalent (eq.)" relates, as is usual in chemical notation, to the relative number of reactive groups present in the reaction.

The term "electrolyte" is used herein in accordance with its standard meaning in the art as a substance containing free ions which can conduct electricity by displacement of charged carrier species. The term is intended to encompass molten electrolytes, liquid electrolytes, semi-solid electrolytes and solid electrolytes wherein at least one of the cationic or anionic components of their electrolyte structure is essentially free for displacement, thus acting as charge carrier.

The curable adhesive compositions of the present invention and the cured adhesives obtained therefrom possess "electrolyte functionality" in that the adhesive material permits the conduction of ions, either anions, cations or both. The electrolyte functionality is understood to derive from the ability of the compositions and cured adhesives to solvate ions of at least one polarity.

As used herein, "(meth)acryl" is a shorthand term referring to "acryl" and/or "methacryl". Thus the term "(meth)acrylamide" refers collectively to acrylamide and methacrylamide.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. Where applicable, a preference for a given substituent will be noted in the specification. In general, however, a preference for alkyl groups containing from 1-18 carbon atoms ($C_1$-$C_{18}$ alkyl)— for example alkyl groups containing from 1 to 12 carbon atoms ($C_1$-$C_{12}$ alkyl) or from 1 to 6 carbon atoms ($C_1$-$C_6$ alkyl)—should be noted.

The term "$C_1$-$C_{18}$ hydroxyalkyl" as used herein refers to a HO-(alkyl) group having from 1 to 18 carbon atoms, where the point of attachment of the substituent is through the oxygen-atom and the alkyl group is as defined above.

An "alkoxy group" refers to a monovalent group represented by —OA where A is an alkyl group: non-limiting examples thereof are a methoxy group, an ethoxy group and an iso-propyloxy group. The term "$C_1$-$C_{18}$ alkoxyalkyl" as used herein refers to an alkyl group having an alkoxy substituent as defined above and wherein the moiety (alkyl-O-alkyl) comprises in total from 1 to 18 carbon atoms: such groups include methoxymethyl (—$CH_2OCH_3$), 2-methoxyethyl (—$CH_2CH_2OCH_3$) and 2-ethoxyethyl.

The term "$C_2$-$C_4$ alkylene" as used herein, is defined as saturated, divalent hydrocarbon radical having from 2 to 4 carbon atoms.

The term "$C_3$-$C_{30}$ cycloalkyl" is understood to mean an optionally substituted, saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; ($C_1$-$C_4$)alkylphenyl, such as tolyl and ethylphenyl; indenyl; naphthalenyl, tetrahydronaphthyl, tetrahydroindenyl; tetrahydroanthracenyl; and, anthracenyl. And a preference for phenyl groups may be noted.

As used herein, "$C_2$-$C_{20}$ alkenyl" refers to hydrocarbyl groups having from 2 to 20 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: —CH=$CH_2$; —CH=$CHCH_3$; —$CH_2CH$=$CH_2$; —C(=$CH_2$)($CH_3$); —CH=$CHCH_2CH_3$; —$CH_2CH$=$CHCH_3$; —$CH_2CH_2CH$=$CH_2$; —CH=C($CH_3$)$_2$; —$CH_2C$(=$CH_2$)($CH_3$); —C(=$CH_2$)$CH_2CH_3$; —C($CH_3$)=$CHCH_3$; —C($CH_3$)$CH$=$CH_2$; —CH=$CHCH_2CH_2CH_3$; —$CH_2CH$=$CHCH_2CH_3$; —$CH_2CH_2CH$=$CHCH_3$; —$CH_2CH_2CH_2CH$=$CH_2$; —C(=$CH_2$)$CH_2CH_2CH_3$; —C($CH_3$)=$CHCH_2CH_3$; —CH($CH_3$)CH=$CHCH$; —CH($CH_3$)$CH_2CH$=$CH_2$; —$CH_2CH$=C($CH_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

As used herein, "alkylaryl" refers to alkyl-substituted aryl groups and "substituted alkylaryl" refers to alkylaryl groups further bearing one or more substituents as set forth above. Further, as used herein "aralkyl" means an alkyl group substituted with an aryl radical as defined above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl", "heterocycloalkyl" and "heteroaryl" moieties are alkyl, cycloalkyl and aryl groups as defined hereinabove, respectively, containing N, O, Si or S as part of their structure.

The term "equivalent weight" as used herein refers to the molecular weight divided by the number of a function concerned. As such, "epoxy equivalent weight" (EEW) means the weight of resin, in grams, that contains one equivalent of epoxy.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

The term "latent" as used herein is meant to refer to an inert functional group which can be selectively converted to a reactive functional group at the appropriate point in the synthetic sequence: the triggering event for this conversion may be inter alia moisture, heat or irradiation.

The term "accelerator" as used herein refers to a chemical agent that is co-reactive with the curative and which reduces the cure time of the composition relative to that achievable with said curative alone under equivalent conditions.

The molecular weights referred to in this specification can be measured with gel permeation chromatography (GPC) using polystyrene calibration standards, such as is done according to ASTM 3536.

Viscosities of the compositions described herein are, unless otherwise stipulated, measured using the Anton Paar Viscometer, Model MCR 301 at standard conditions of 25° C. and 50% Relative Humidity (RH). The viscometer is calibrated one time a year and checked by services. The calibration is done with using special oil of known viscosity, which vary from 5,000 cps to 50,000 cps (parallel plate PP25 and at shear rate 1 1/s at 23° C.). Measurements of the compositions according to the present invention are done using the parallel plate PP20 at different shear rates from 1.5 1/s to 100 1/s.

DETAILED DESCRIPTION OF THE INVENTION

Epoxy Resin

The composition comprises epoxy resin which will typically be present in an amount of from 15 to 75 wt. %, based on the weight of said composition: it is preferred that the epoxy resin constitutes from 20 to 65 wt. %, for example from 23 to 61 wt. % of said composition.

These epoxy resin quantities are preferred because quantity greater than 75% may adversely affect lap shear strength and debonding effect, whereas low quantities, mainly below 15% may lead to decrease in adhesive properties.

Epoxy resins as used herein may include mono-functional epoxy resins, multi- or poly-functional epoxy resins, and combinations thereof. The epoxy resins may be pure compounds but equally may be mixtures epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may also be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an embodiment, the monoepoxide compound conforms to Formula (I) herein below:

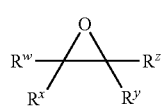

(I)

wherein: $R^w$, $R^x$, $R^y$ and $R^z$ may be the same or different and are independently selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^y$ and $R^z$ is not hydrogen.

It is preferred that $R^w$, $R^x$ and $R^y$ are hydrogen and $R^z$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, reference is made to using at least one monoepoxide compound selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and, cyclododecene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a costs standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid $C_1$-$C_{18}$ alkyl esters; butadiene diepoxide; polybutadiene diglycidyl ether; vinylcyclohexene diepoxide; and, limonene diepoxide.

Further illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

And examples of highly preferred polyepoxide compounds include: bisphenol-A epoxy resins, such as DER™ 331, DER™ 330, DER™ 337 and DER™ 383; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; and, sorbitol glycidyl ether, such as ERISYS™ GE-60.

The above aside, the composition can in certain embodiments comprise glycidoxy alkyl alkoxy silanes having the formula:

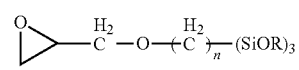

wherein: each R is independently selected from methyl or ethyl; and,
n is from 1-10.

Exemplary silanes include but are not limited to: γ-glycidoxy propyl trimethoxy silane, γ-glycidoxy ethyl trimethoxy silane, γ-glycidoxy methyl trimethoxy silane, γ-glycidoxy methyl triethoxy silane, γ-glycidoxy ethyl triethoxy silane, γ-glycidoxy propyl triethoxy silane; and, 8-glycidooxyoctyl trimethoxysilane. When present, the epoxide functional silanes should constitute less than less than 20 wt. %, preferably less than 10 wt. % or less than 5 wt. %, based on the total weight of the epoxide compounds.

The present invention also does not preclude the curable compositions from further comprising one or more cyclic monomers selected from the group consisting of: oxetanes; cyclic carbonates; cyclic anhydrides; and, lactones. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and, EP-A-0 119 840. However, such cyclic co-monomers should constitute less than 20 wt. %, preferably less than 10 wt. % or less than 5 wt. %, based on the total weight of the epoxide compounds.

Curing Agent

There is no particular intention to limit the curative which may have utility in the present invention. For instance, the curative may comprise or consist of reactive curatives being compounds which possess at least two epoxide reactive groups per molecule. Equally, the curative may comprise or consist of latent curatives, including photo-latent curatives. Combinations of reactive and latent curatives are envisaged within the context of the present invention. That aside, the amount of curative present in the composition should be sufficient to effect cure of the epoxy resin.

Reactive curatives may, in particular, include one or more of: i) at least one polyamine having at least two amine hydrogens reactive toward epoxide groups; ii) at least one mercapto compound having at least two mercapto groups reactive toward epoxide groups; and, iii) at least one Mannich base.

The at least one polyamine having at least two amine hydrogens reactive toward epoxide groups should, in particular, contain primary and/or secondary amine groups and have an equivalent weight per primary or secondary amine group of not more than 150 g/eq., more preferably not more than 125 g/eq.

Suitable polyamines, which may be used alone or in combination, include but are not limited to the following:
i) Aliphatic, cycloaliphatic or arylaliphatic primary diamines of which the following examples may be mentioned: 2,2-dimethyl-1,3-propanediamine; 1,3-pentanediamine (DAMP); 1,5-pentanediamine; 1,5-diamino-2-methylpentane (MPMD); 2-butyl-2-ethyl-1,5-pentanediamine (C11-neodiamine); 1,6-hexanediamine (hexamethylenediamine, HMDA); 2,5-dimethyl-1,6-hexanediamine; 2,2,4- and/or 2,4,4-trimethylhexamethylenediamine; 1,7-heptanediamine; 1,8-octanediamine; 1,9-nonanediamine; 1,10-decanediamine; 1,11-undecanediamine; 1,12-dodecanediamine; 1,2-, 1,3- and 1,4-diaminocyclohexane; bis(4-aminocyclohexyl)methane; bis(4-amino-3-methylcyclohexyl)methane; bis(4-amino-3-ethylcyclohexyl)methane; bis(4-amino-3,5-dimethylcyclohexyl)methane; bis(4-amino-3-ethyl-5-methylcyclohexyl)methane; 1-amino-3-aminomethyl-3,5,5-trimethylcyclohexane (isophorone diamine, IPDA); 2- and/or 4-methyl-1,3-diaminocyclohexane; 1,3-bis(aminomethyl)-cyclohexane; 1,4-bis(aminomethyl)cyclohexane; 2,5(2,6)-bis(aminomethyl)-bicyclo[2.2.1]heptane (norborane diamine, NBDA); 3(4),8(9)-bis(aminomethyl)tricyclo[5.2.1.0(2, 6)]-decane (TCD-diamine); 1,4-diamino-2,2,6-trimethylcyclohexane (TMCDA); 1,8-menthanediamine; 3,9-bis(3-aminopropyl)-2,4,8,10-tetraoxaspiro[5.5] undecane; and, 1,3-bis(aminomethyl)benzene (MXDA).

ii) Tertiary amine group-containing polyamines with two or three primary aliphatic amine groups of which the following specific examples may be mentioned: N,N'-bis(aminopropyl)-piperazine; N,N-bis(3-aminopropyl) methylamine; N,N-bis(3-aminopropyl)ethylamine; N,N-bis(3-aminopropyl)propylamine; N,N-bis(3-aminopropyl)cyclohexylamine; N,N-bis(3-aminopropyl)-2-ethyl-hexylamine; tris(2-aminoethyl)amine; tris(2-aminopropyl)amine; tris(3-aminopropyl)amine; and, the products from the double cyanoethylation and subsequent reduction of fatty amines derived from natural fatty acids, such as N,N-bis(3-aminopropyl)dodecylamine and N,N-bis(3-aminopropyl)tallow alkylamine, commercially available as Triameen® Y12D and Triameen® YT (from Akzo Nobel).

iii) Ether group-containing aliphatic primary polyamines of which the following specific examples may be mentioned: bis(2-aminoethyl)ether; 3,6-dioxaoctane-1, 8-diamine; 4,7-dioxadecane-1,10-diamine; 4,7-dioxadecane-2,9-diamine; 4,9-dioxadodecane-1,12-diamine; 5,8-dioxadodecane-3,10-diamine; 4,7,10-trioxatridecane-1,13-diamine and higher oligomers of these diamines; bis(3-aminopropyl)polytetrahydrofuranes and other polytetrahydrofuran diamines; cycloaliphatic ether group-containing diamines obtained from the propoxylation and subsequent amination of 1,4-dimethylolcyclohexane, such as that material commercially available as Jeffamine® RFD-270 (from Huntsman); polyoxyalkylenedi- or -triamines obtainable as products from the amination of polyoxyalkylenedi- and -triols and which are commercially available under the name of Jeffamine® (from Huntsman), under the name of polyetheramine (from BASF) or under the name of PC Amines® (from Nitroil). A particular preference may be noted for the use of Jeffamine® D-230, Jeffamine® D-400, Jeffamine® D-600, Jeffamine® D-2000, Jeffamine® D-4000, Jeffamine® T-403, Jeffamine® T-3000, Jeffamine® T-5000, Jeffamine® EDR-104, Jeffamine® EDR-148 and Jeffamine® EDR-176, as well as corresponding amines from BASF or Nitroil.

iv) Primary diamines with secondary amine groups of which the following examples may be mentioned: 3-(2-aminoethyl)aminopropylamine, bis(hexamethylene)triamine (BHMT); diethylenetriamine (DETA); triethylenetetramine (TETA); tetraethylenepentamine (TEPA); pentaethylenehexamine (PEHA); higher homologs of linear polyethyleneamines, such as polyethylene polyamines with 5 to 7 ethyleneamine units (so-called "higher ethylenepolyamine," HEPA); products from the multiple cyanoethylation or cyanobutylation and subsequent hydrogenation of primary di- and polyamines with at least two primary amine groups, such as dipropylenetriamine (DPTA), N-(2-aminoethyl)-1,3-propanediamine (N3-amine), N,N'-bis(3-aminopropyl)ethylenediamine (N4-amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine or N,N'-bis(3-amino-1-ethylpropyl)-2-methyl-1,5-pentanediamine.

v) Polyamines with one primary and at least one secondary amino group of which the following examples may be mentioned: N-butyl-1,2-ethanediamine; N-hexyl-1,2-ethanediamine; N-(2-ethylhexyl)-1,2-ethanediamine; N-cyclohexyl-1,2-ethanediamine; 4-aminomethyl-piperidine; N-(2-aminoethyl)piperazine; N-methyl-1,3-propanediamine; N-butyl-1,3-propanediamine; N-(2-ethylhexyl)-1,3-propanediamine; N-cyclohexyl-1,3-propanediamine; 3-methylamino-1-pentylamine; 3-ethylamino-1-pentylamine; 3-cyclohexylamino-1-pentylamine; fatty diamines such as N-cocoalkyl-1,3-propanediamine; products from the Michael-type addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a 1:1 molar ratio; products from the partial reductive alkylation of primary polyamines with aldehydes or ketones, especially N-monoalkylation products of the previously mentioned polyamines with two primary amine groups and in particular of 1,6-hexanediamine, 1,5-diamino-2-methylpentane, 1,3-bis(aminomethyl)cyclohexane, 1,4-bis(aminomethyl)cyclohexane, 1,3-bis(aminomethyl)benzene, BHMT, DETA, TETA, TEPA, DPTA, N3-amine and N4-amine, wherein preferred alkyl groups are benzyl, isobutyl, hexyl and 2-ethylhexyl; and, partially styrenated polyamines such as those commercially available as Gaskamine® 240 (from Mitsubishi Gas Chemical).

vi) Secondary diamines and, in particular, N,N'-dialkylation products of the previously mentioned polyamines with two primary amine groups, especially N,N'-dialkylation products of 1,6-hexanediamine, 1,5-diamino-2-methylpentane, 1,3-bis(aminomethyl)cyclohexane, 1,4-bis(aminomethyl)-cyclohexane, 1,3-bis(aminomethyl)benzene, BHMT, DETA, TETA, TEPA, DPTA, N3-amine or N4-amine, wherein preferred alkyl groups are 2-phenylethyl, benzyl, isobutyl, hexyl and 2-ethylhexyl.

vii) Aromatic polyamines of which mention may be made of: m- and p-phenylenediamine; 4,4'-, 2,4' and 2,2'-diaminodiphenylmethane; 3,3'-dichloro-4,4'-diaminodiphenylmethane (MOCA); 2,4- and 2,6-tolylenediamine; mixtures of 3,5-dimethylthio-2,4- and -2,6-tolylenediamine (available as Ethacure® 300 from Albermarle); mixtures of 3,5-diethyl-2,4- and -2,6-tolylene diamine (DETDA); 3,3',5,5'-tetraethyl-4,4'-diaminodiphenylmethane (M-DEA); 3,3',5,5'-tetraethyl-2,2'-dichloro-4,4'-diaminodiphenylmethane (M-CDEA); 3,3'-diisopropyl-5,5'-dimethyl-4,4'-diaminodiphenylmethane (M-MIPA); 3,3',5,5'-tetraisopropyl-4,4'-diaminodiphenylmethane (M-DIPA); 4,4'-diamino diphenyl-sulfone (DDS); 4-amino-N-(4-aminophenyl)benzenesulfonamide; 5,5'-methylenedianthranilic acid; dimethyl-(5,5'-methylenedianthranilate); 1,3-propylene-bis(4-aminobenzoate); 1,4-butylene-bis(4-aminobenzoate); polytetramethylene oxide-bis(4-aminobenzoate) (available as Versalink® from Air Products); 1,2-bis(2-aminophenylthio)ethane, 2-methylpropyl-(4-chloro-3,5-diaminobenzoate); and, tert.butyl-(4-chloro-3,5-diaminobenzoate).

viii) Polyamidoamines of which indicative members include the reaction products of monohydric or polyhydric carboxylic acids or the esters or anhydrides thereof,—in particular dimer fatty acids—and an aliphatic, cycloaliphatic or aromatic polyamine, for instance polyalkyleneamines such as DETA or TETA. Commercially available polyamidoamines include: Versamid® 100, 125, 140 and 150 (from Cognis); Aradur® 223, 250 and 848 (from Huntsman); Euretek® 3607 and 530 (from Huntsman); and, Beckopox® EH 651, EH 654, EH 655, EH 661 and EH 663 (from Cytec).

Preferred among the aforementioned polyamines having at least two primary aliphatic amine groups are: isophorone diamine (IPDA); hexamethylene diamine (HMDA); 1,3-bis(amino-methyl)cyclohexane; 1,4-bis(aminomethyl)cyclohexane; bis(4-amino-cyclohexyl)methane; bis(4-amino-3-methylcyclohexyl)methane; NBDA; and, ether group-containing polyamines with a number average molecular weight (Mn) of up to 500 g/mol. Particularly preferred among said ether group-containing polyamines are Jeffamine® D-230 and D-600 (available from Huntsman).

As noted above, the composition of the present invention may optionally comprise—as a reactive curative—at least one compound which has at least two reactive mercapto—groups per molecule. Suitable mercapto-group containing compounds, which may be used alone or in combination, include but are not limited to the following.

Liquid mercaptan-terminated polysulfide polymers of which commercial examples include: Thiokol® polymers (available from Morton Thiokol), in particular the types LP-3, LP-33, LP-980, LP-23, LP-55, LP-56, LP-12, LP-31, LP-32 and LP-2 thereof; and, Thioplast® polymers (from Akzo Nobel), in particular the types G10, G112, G131, G1, G12, G21, G22, G44 and G 4.'

Mercaptan-terminated polyoxyalkylene ethers, obtainable by reacting polyoxyalkylenedi- and -triols either with epichlorohydrin or with an alkylene oxide, followed by sodium hydrogen sulfide.

Mercaptan-terminated compounds in the form of polyoxyalkylene derivatives, known under the trade name of Capcure® (from Cognis), in particular the types WR-8, LOF and 3-800 thereof.

Polyesters of thiocarboxylic acids of which particular examples include: pentaerythritol tetramercapto-acetate (PETMP); trimethylolpropane trimercaptoacetate (TMPMP); glycol dimercaptoacetate; and, the esterification products of polyoxyalkylene diols and triols, ethoxylated trimethylolpropane and polyester diols with thiocarboxylic acids such as thioglycolic acid and 2- or 3-mercaptopropionic acid.

2,4,6-trimercapto-1,3,5-triazine, 2,2'-(ethylenedioxy)-diethanethiol (triethylene glycol dimercaptan) and/or ethanedithiol.

Tris(2-(mercaptopropionyloxy)ethyl)isocyanate.

A preference for the use of polyesters of thiocarboxylic acids and, in particular, for the use of at least one of pentaerythritol tetramercapto-acetate (PETMP), tris-(3-mercaptopropionate) (TMP), trimethylolpropane trimercaptoacetate (TMPMP), tris(2-(mercaptopropionyloxy)ethyl)isocyanate and glycol dimercaptoacetate is acknowledged.

As noted above, a reactive curative may comprise at least one Mannich base. Such compounds may be characterized by containing at least one phenalkamine and, in particular, a phenalkamine obtained from the condensation of cardanol (CAS Number: 37330-39-5), an aldehyde and an amine. The reactant amine in the condensation reaction is desirably ethylenediamine or diethyltriamine.

Mannich bases and phenalkamines are known in the art and suitable examples include the commercially available phenalkamines Cardolite® NC-541, NC-557, NC-558, NC-566, Lite 2001 and Lite 2002 (available from Cardolite), Aradur® 3440, 3441, 3442 and 3460 (available from Huntsman) and Beckopox® EH 614, EH 621, EH 624, EH 628 and EH 629 (available from Cytec).

Any common latent epoxy curing agents used in the art can be used in the present invention without special limitations. For example, suitable latent epoxy curing agents which may be used herein are described in: U.S. Pat. Nos. 4,546,155; 7,226,976; 4,833,226; JP2008214567; UK Patent No. GB 1,121,196; WO2014/165423; and, U.S. Pat. No. 5,077,376. Further, examples of commercially available latent epoxy curing agents include Amicure PN-23, PN-40, PN—H, MY-24 and PN-50 commercially available from Ajinomoto Co., Inc.; EH-4337S, EH-3293S and EH-4357S commercially available from Asahi Denka Co. Ltd.; Novacure HX-3722 and HXA-3921 HP commercially available from Asahi Kasei Kogyo. K.K.; and, Sunmide LH-210, Ancamin 2014AS/FG and Ancamin 2337S commercially available from Air Products and Chemicals, Inc.

As is known in the art, dicyandiamide finds common utility as a latent epoxy curing agent and may indeed be used in the present compositions. When employed, it is preferred that said dicyandiamide is in finely divided form: an average particle size (d50) of from 0.5 to 100 µm, for example from 1 to 50 µm or from 2 to 20 µm might be noted as desirable. Said particle size refers to the diameter or largest dimension of a particle in a distribution of particles and is measurable via dynamic light scattering.

Further exemplary latent epoxy curing agents include but are not limited: ketimines obtainable by the reaction of aliphatic polyamines and ketones; polyethyleneimines, in particular polyethyleneimines having a weight average molecular weight (Mw) from 700 to 1,000,000; imidazole derivatives such as 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethyl-imidazole; 2,4-diamino-8-2-methylimidazolyl-(1)-ethyl-5-triazine; addition products of triazine with isocyanuric acid; hydrazides such as succinohydrazide, adipohydrazide, isophtholohydrazide o-oxybenzohydrazide and salicylohydrazide.

When formulating the curable composition, it is preferred that the composition comprises from 0.01 to 25 wt. % of said curing agent for said epoxy resin, based on the weight of the composition. Preferably said composition comprises from 0.1 to 23 wt. %, for example from 0.5 to 21 wt. % of said curing agent.

These curing agent quantities are preferred because quantity greater than 25% may lead to excess of free amine in a composition, which may adversely affect lap shear strength whereas low quantities, mainly below 0.01% may lead to incomplete cure.

Accelerator

The composition of the present invention should preferably comprise at least one accelerator, which accelerator is a substance that promotes the reaction between the epoxide groups and the epoxide-reactive groups of the curative, for instance the reaction between the amine or thiol groups and the epoxide groups. A specific example relates to the use of an amine accelerator which functions by de-protonation of reactive thiol (—SH) groups present to thiolate (—S"), which thiolate reacts with epoxy group by nucleophilic ring opening polymerization.

Without intention to the limit the accelerators used in the present invention, mention may be made of the following suitable accelerators: i) acids or compounds hydrolysable to acids, in particular a) organic carboxylic acids, such as acetic acid, benzoic acid, salicylic acid, 2-nitrobenzoic acid and lactic acid; b) organic sulfonic acids, such as methanesulfonic acid, p-toluenesulfonic acid and 4-dodecylbenzenesulfonic acid; c) sulfonic acid esters; d) inorganic acids, such as phosphoric acid; e) Lewis acid compounds, such as $BF_3$ amine complexes, $SbF_6$ sulfonium compounds, bis-arene iron complexes; f) Bronsted acid compounds, such as pentafluoroantimonic acid complexes; and, e) mixtures of the aforementioned acids and acid esters; ii) phenols, in particular bisphenols; ii) tertiary amines, such as 2piperazin-1-ylethanamine, 1,4-diazabicyclo[2.2.2]octane, benzyldimethylamine, α-methylbenzyl dimethylamine, triethanolamine, dimethylamino propylamine, imidazoles—including N-methylimidazole, N-vinylimidazole and 1,2-dimethylimidazole—and salts of such tertiary amines; iii) quaternary ammonium salts, such as benzyltrimethyl ammonium chloride; iv) amidines, such as 1,8-diazabicyclo[5.4.0]undec-7-ene; v) guanidines, such as 1,1,3,3-tetramethylguanidine; iv) phenol resins; and, v) phosphites, such as di- and triphenylphosphites.

The skilled artisan will recognize that the selection of an accelerator is not simply concerned with adding the fastest accelerator. Other factors determinative in the selection of accelerators include: cost; toxicity; solubility; processing effects, such as working time, premature gelation, exothermic degradation, expansion and off-gassing; final properties, such as glass transition temperature ($T_g$), modulus, strength, elongation at break and chemical resistance; regulatory concerns; and, ease of use.

It is preferred in the present invention to employ an accelerator comprising or consisting of at least one tertiary amine, at least one amidine or mixtures thereof. More particularly, said accelerator should be selected from the group consisting of imidazole, methylimidazole, benzyldimethylamine, 1,8-diazabicyclo[5.4.0]undec-7-ene, 1,4-diazabicyclo(2,2,2)octane and mixtures thereof.

The accelerator should desirably be present in the composition in an amount of from 0.1 to 15 wt. %, based on the weight of the composition: the accelerator may preferably constitute from 1 to 10 wt. %, for example from 5 to 10 wt. % of said composition.

These accelerator quantities are preferred because quantity greater than 15% may lead to an excess of accelerator in a composition, which may adversely affect cure process and adhesive properties, whereas low quantities, mainly below 0.01%, may lead no physical effect.

Electrolyte

The composition comprises from 2 to 25 wt. %, based on the weight of the composition, of electrolyte: the electrolyte may preferably constitute from 3 to 20 wt. %, for example from 5 to 18 wt. % of said composition.

These electrolyte quantities are preferred because quantity greater than 25% may lead to good debonding effect, however the cure may be incomplete and therefore, initial adhesive properties may be adversely affected, whereas low quantities, mainly below 2%, may lead to a lack of debonding effect.

The electrolyte preferably comprises at least one salt having a Formula selected from the group consisting of:

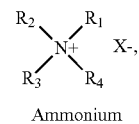

Ammonium

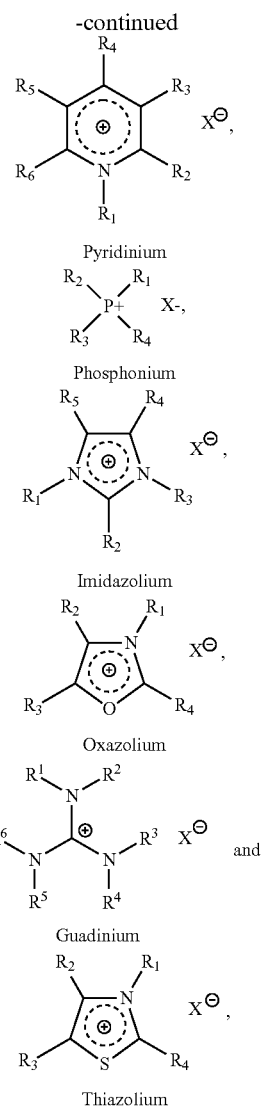

Pyridinium

Phosphonium

Imidazolium

Oxazolium

Guadinium

Thiazolium wherein: $R^1$, $R^2$, $R^3$, $R^4$, $R^5$ and $R^6$ are independently selected from hydrogen, $C_1$-$C_{18}$ alkyl, $C_3$-$C_{18}$ cycloalkyl, $C_6$-$C_{18}$ aryl, $C_7$-$C_{24}$ aralkyl, $C_2$-$C_{20}$ alkenyl, —C(O)$R^q$, —C(O)OH, —CN and —NO$_2$; and, $R^q$ is $C_1$-$C_6$ alkyl.

For completeness, the terms $C_1$-$C_{18}$ alkyl, $C_3$-$C_{18}$ cycloalkyl, $C_6$-$C_{18}$ aryl, $C_7$-$C_{24}$ aralkyl, $C_2$-$C_{20}$ alkenyl expressly include groups wherein one or more hydrogen atoms are substituted by halogen atoms (e.g. $C_1$-$C_{18}$ haloalkyl) or hydroxyl groups (e.g. $C_1$-$C_{18}$ hydroxyalkyl). In particular, it is preferred that $R^1$, $R^2$, $R^3$, $R^4$, $R^5$ and $R^6$ are independently selected from hydrogen, $C_1$-$C_{12}$ alkyl, $C_1$-$C_{12}$ haloalkyl, $C_1$-$C_{12}$ hydroxyalkyl and $C_3$-$C_{12}$ cycloalkyl. For example, $R^1$, $R^2$, $R^3$, $R^4$, $R^5$ and $R^6$ may be independently selected from hydrogen, $C_1$-$C_6$ alkyl, $C_1$-$C_6$ haloalkyl and $C_1$-$C_6$ hydroxyalkyl.

There is no particular intention to limit the counter anion (X—) which may be employed in the electrolyte. Exemplary anions may be selected from:

Halides;
Pseudohalides and halogen-containing compounds of the formulae $PF_6^-$, $CF_3SO_3^-$, $(CF_3SO_3)_2N^-$, $CF_3CO_2^-$ and $CCl_3CO_2^-$,
$CN^-$, $SCN^-$ and $OCN^-$;
Phenates;
Sulfates, sulfites and sulfonates of the general formulae $SO_4^{2-}$, $HSO_4^-$, $SO_3^{2-}$, $HSO_3^-$, $R^aOSO_3^-$ and $R^aSO_3^-$;
Phosphates of the general formulae $PO_4^{3-}$, $HPO_4^{2-}$, $H_2PO_4^-$, $R^aPO_4^{2-}$, $HR^aPO_4^-$ and $R^aR^bPO_4^-$;
Phosphonates and phosphinates of the general formulae $R^aHPO_3^-$, $R^aR^bPO_2^-$ and $R^aR^bPO_3^-$;
Phosphites of the general formulae: $PO_3^{3-}$, $HPO_3^{2-}$, $H_2PO_3^-$, $R^aPO_3^{2-}$, $R^aHPO_3^-$ and $R^aR^bPO_3^-$;
Phosphonites and phosphinites of the general formulae $R^aR^bPO_2^-$, $R^aHPO_2^-$, $R^aR^bPO^-$ and $R^aHPO^-$;
Carboxylic acid anions of the general formula $R^aCOO^-$;
Hydroxycarboxylic acids anions and sugar acid anions;
Saccharinates (salts of o-benzoic acid sulfimide);
Borates of the general formulae $BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$ and $B(R^aSO_4)^-$;
Boronates of the general formulae $R^aBO_2^{2-}$ and $R^aR^bBO^-$;
Carbonates and carbonic acid esters of the general formulae $HCO_3^-$, $CO_3^{2-}$ and $R^aCO_3^-$;
Silicates and silicic acid esters of the general formulae $SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$ and $HR^aR^bSiO_4^-$;
Alkyl- and arylsilanolates of the general formulae $R^aSiO_3^{3-}$, $R^aR^bSiO_2^{2-}$, $R^aR^bR^cSiO^-$, $R^aR^bR^cSiO_3^-$, $R^aR^bR^cSiO_2^-$ and $R^aR^bSiO_3^{2-}$;
Pyridinates and pyrimidinates;
Carboxylic acid imides, bis(sulfonyl)imides and sulfonylimides of the general formulae:

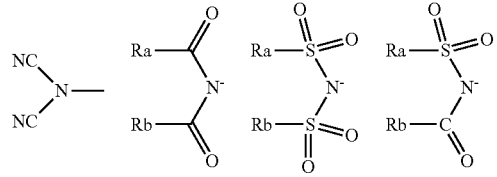

Methides of the general formula:

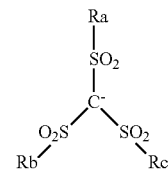

Alkoxides and aryloxides of the general formula $R^aO^-$; and,
Sulfides, hydrogen sulfides, polysulfides, hydrogen polysulfides and thiolates of the general formulae $S^{2-}$, $HS^-$, $[S_v]^{2-}$, $[HS_v]^-$ and $[R^aS]^-$
in which general formulae
v is a whole positive number of from 2 to 10.
$R^a$, $R^b$, $R^c$ and $R^d$ are independently selected from hydrogen, a $C_1$-$C_{12}$ alkyl, $C_5$-$C_{12}$ cycloalkyl, $C_5$-$C_{12}$ heterocycloalkyl, $C_6$-$C_{18}$ aryl and $C_5$-$C_{18}$ heteroaryl.

Based on the definitions in the above list, preferred anions are selected from the group consisting of: halides; pseudohalides and halogen-containing compounds as defined above; carboxylic acid anions, in particular formate, acetate, propionate, butyrate and lactate; hydroxycarboxylic acid anions; pyridinates and pyrimidinates; carboxylic acid imides, bis(sulfonyl)imides and sulfonylimides; sulfates, in particular methyl sulfate and ethyl sulfate; sulfites; sulfonates, in particular methansulfonate; and, phosphates, in particular dimethyl-phosphate, diethyl-phosphate and di-(2-ethylhexyl)-phosphate.

The electrolyte is preferably selected from the group consisting of 1-ethyl-3-methylimidazolium methansulfonate, 1-ethyl-3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di(2-hydroxyethyl) ammonium trifluoroaetate, N,N-dimethyl (2-hydroxyethyl) ammonium octanoate, methyltrioctylammonium bis (trifluoromethylsulfonyl) imide, N-ethyl-N—N—N—N-tetramethylguanidinium trifluoromethanesulfonate, guanidinium trifluoromethanesulfonate, 1-butyl-4-methylpyridinium bromide, 1-butyl-3-methylpyridinium tetrafluoroborate, 1-butyl-3-hydroxymethylpyridinium ethylsulfate, 1-butyl-1-methylpyrrolidinium bis (trifluoromethylsulfonyl) imide, 1-butyl-methylpyrrolidinium tris (pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2,3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris (pentafluoroethyl) trifluorophosphate, trihexyl (tetradecyl) phosphonium tetrafluoroborate and mixtures thereof. A particular preference for the use of at least one of 1-ethyl-3-methylimidazolium methansulfonate, 1-ethyl-3-methylimidazolium methyl sulfate, may be mentioned.

Above listed electrolytes are preferred because they provide good stability for the composition and provide good initial adhesion strength, and upon treatment with potential they provide good debonding effect.

Electrically Non-Conductive Filler

The composition of the present invention is characterized by the presence of electrically non-conductive filler. Broadly, there is no particular intention to limit the shape of the particles employed as non-conductive fillers: particles that are acicular, spherical, ellipsoidal, cylindrical, bead-like, cubic or platelet-like may be used alone or in combination. Moreover, it is envisaged that agglomerates of more than one particle type may be used. Equally, there is no particular intention to limit the size of the particles employed as non-conductive fillers. However, such non-conductive fillers will conventionally have an average volume particle size, as measured by laser diffraction/scattering methods, of from 0.1 to 1500 μm, for example from 1 to 1000 μm or from 1 to 500 μm.

Exemplary non-conductive fillers include but are not limited to chalk, lime powder, precipitated and/or pyrogenic silicic acid, zeolites, bentonites, magnesium carbonate, diatomite, alumina, clay, talc, sand, quartz, flint, mica, glass powder, and other ground mineral substances. Short fibres such as glass fibres, glass filament, polyacrylonitrile, carbon fibres, or polyethylene fibres can also be added.

The pyrogenic and/or precipitated silicic acids advantageously have a BET surface area from 10 to 90 $m^2/g$. When they are used, they do not cause any additional increase in the viscosity of the composition according to the present invention but do contribute to strengthening the cured composition.

It is likewise conceivable to use pyrogenic and/or precipitated silicic acids having a higher BET surface area, advantageously from 100 to 250 $m^2/g$ as a filler: because of the greater BET surface area, the effect of strengthening the cured composition is achieved with a smaller proportion by weight of silicic acid.

Also suitable as non-conductive fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 μm or less, more preferably from 100 to 200 μm.

Non-conductive fillers which impart thixotropy to the composition may be preferred for many applications: such fillers are also described as rheological adjuvants, e.g. hydrogenated castor oil, fatty acid amides, or swellable plastics such as PVC.

Preferably said electrically non-conductive filler is selected from the group consisting of calcium carbonate, calcium oxide, talcum, fumed silica, silica, wollastonite, barium sulphate and mixtures thereof.

In a highly preferred embodiment, the composition according to the present invention comprises fumed silica as non-electrically conductive filler.

Hydrophobicity may be required by the electrolyte for it to be dissolved into the composition and to avoid phase separation. Non-conductive fillers, and especially fumed silica, provide required hydrophobicity to the composition, and therefore, improve solubility of the electrolyte and prevent phase separation. Further, the technical data indicates that the presence of a non-electrically conductive filler improves the initial adhesive properties of the composition.

The desired viscosity of the curable composition formed may be determinative of the amount of filler used. Having regard to that latter consideration, the total amount of fillers—both electrically conductive and non-conductive—present in the compositions should not prevent the composition from being readily extrudable from a suitable dispensing apparatus, such as a tube: conventionally such extrudable curable compositions should possess a viscosity of from 3000 to 200,000, preferably from 20,000 to 100,000 mPas, more preferably from 40,000 to 80,000 mPas, or even from 50,000 to 60,000 mPas.

The above viscosity conditions aside, it is preferred that said electrically non-conductive filler is present in an amount of from 1 to 50% by weight of the total weight of the composition, preferably from 1.5 to 48% more preferably from 2 to 47%.

These electrically non-conductive filler quantities are preferred because quantity greater than 50% may lead to inadequate adhesion properties, whereas low quantities, mainly below 1%, may lead to inadequate adhesion properties and viscosity issues.

Combination of Solubilizer and Toughener

The solubilizer has the function of promoting the miscibility of the electrolyte within the adhesive composition: the solubilizer may or may not form part of the polymer matrix formed upon curing of the adhesive composition but does serve to facilitate ion transfer therein. The solubilizer is, as such, preferably a polar compound and should desirably be liquid at room temperature.

Suitable classes of solubilizer include: polyphosphazenes; polymethylenesulfides; polyoxyalkylene glycols; polyethylene imines; silicone surfactants, such as polyalkylsiloxane and polyoxyalkylene modified polydimethylsiloxanes including but not limited to poly(C2-C3)oxyalkylene modified polydimethylsiloxanes; co-polymers of functionalized polyalkysiloxanes and epoxy resins, such as copolymers of polydimethylsiloxane (PDMS) and epoxy resin; polpolyhydric alcohols; and, sugars. For completeness, fluorinated silicone surfactants, such as fluorinated polysilanes, are intended to be encompassed within the term silicone surfactants.

Polyhydric alcohols and sugars such as ethylene glycol, 1,3-propanediol, cyclohexandiol, hydroquinone, catechol, resorcinol, phloroglucinol, pyrogallol, hydroxyhydroquinone, tris(hydroxymethyl)benzene, tris(hydroxymethyl)benzene with three methyl or ethyl substituents bonded to the remaining benzene carbon atoms, isosorbide, isomannide, isoidide, glycerol, cyclohexane-1,2,4-triol, 1,3,5-cyclohexanetriol, pentane-1,2,3-triol, hexane-1,3,5-triol, erythritol, 1,2,4,5-tetrahydroxybenzene, threitol, arabitol, xylitol, ribitol, mannitol, sorbitol, inositol, fructose, glucose, mannose, lactose, 1,1,1-tris(hydroxymethyl)propane, 1,1,1-tris(hydroxymethyl)ethane, di(trimethylolpropane), trimethylolpropane ethoxylate, 2-hydroxymethyl-1,3-propanediol, pentaerythritol allyl ether and pentaerythritol.

Of the polyoxyalkylene glycols, a particular preference for the use of polyoxy($C_2$-$C_3$)alkylene glycols having a weight average molecular weight of from 200 to 10000 g/mol, for example 200 to 2000 g/mol, may be noted.

The presence of tougheners in the present composition can be advantageous to the debonding of the cured adhesive when said tougheners are included with a solubilizer. Without intention to be bound by theory, the tougheners facilitate phase separation within the cured adhesive under the application of electrical potential. Good debonding results have, in particular, been obtained where the composition of the present invention contains at least one toughener selected from: epoxy-elastomer adducts; and, toughening rubber in the form of core-shell particles dispersed in the epoxy resin matrix.

Elastomer-containing adducts may be used individually or a combination of two or more particular adducts might be used. Moreover, each adduct may independently be selected from solid adducts or liquid adducts at a temperature of 23° C. Typically, useful adducts will be characterized by a ratio by weight of epoxy to elastomer of from 1:5 to 5:1, for example from 1:3 to 3:1. And an instructive reference regarding suitable epoxy/elastomer adducts is US Patent Publication 2004/0204551. Moreover, exemplary commercial epoxy/elastomer adducts for use herein include but are not limited to: HYPDX RK8-4 commercially available from CVC Chemical; and, B-Tough A3 available from Croda Europe Limited.

The term "core shellrubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The shell layer partially or entirely covers the surface of the rubber particle core in the graft polymerization process. By weight, the core should constitute at least 50 wt. % of the core-shell rubber particle.

The polymeric material of the core should have a glass transition temperature ($T_g$) of no greater than 0° C. and preferably a glass transition temperature ($T_g$) of −20° C. or lower, more preferably −40° C. or lower and even more preferably −60° C. or lower. The polymer of the shell is non-elastomeric, thermoplastic or thermoset polymer having a glass transition temperature ($T_g$) of greater than room temperature, preferably greater than 30° C. and more preferably greater than 50° C.

Without intention to limit the invention, the core may be comprised of: a diene homopolymer, for example, a homopolymer of butadiene or isoprene; a diene copolymer, for example a copolymer of butadiene or isoprene with one or more ethylenically unsaturated monomers, such as vinyl aromatic monomers, (meth)acrylonitrile or (meth)acrylates; polymers based on (meth)acrylic acid ester monomers, such as polybutylacrylate; and, polysiloxane elastomers such as polydimethylsiloxane and crosslinked polydimethylsiloxane.

Similarly without intention to limit the present invention, the shell may be comprised of a polymer or copolymer of one or more monomers selected from: (meth)acrylates, such as methyl methacrylate; vinyl aromatic monomers, such as styrene; vinyl cyanides, such as acrylonitrile; unsaturated acids and anhydrides, such as acrylic acid; and, (meth)acrylamides. The polymer or copolymer used in the shell may possess acid groups that are cross-linked ionically through metal carboxylate formation, in particular through forming salts of divalent metal cations. The shell polymer or copolymer may also be covalently cross-linked by monomers having two or more double bonds per molecule.

It is preferred that any included core-shell rubber particles have an average particle size (d50) of from 10 nm to 300 nm, for example from 50 nm to 250 nm: said particle size refers to the diameter or largest dimension of a particle in a distribution of particles and is measured via dynamic light scattering. For completeness, the present application does not preclude the presence of two or more types of core shell rubber (CSR) particles with different particle size distributions in the composition to provide a balance of key properties of the resultant cured product, including shear strength, peel strength and resin fracture toughness.

The core-shell rubber may be selected from commercially available products, examples of which include: Paraloid EXL 2650A, EXL 2655 and EXL2691 A, available from The Dow Chemical Company; Clearstrength® XT100, available from Arkema Inc.; the Kane Ace® MX series available from Kaneka Corporation, and in particular MX 120, MX 125, MX 130, MX 136, MX 551, MX553; and, METABLEN SX-006 available from Mitsubishi Rayon.

In those embodiments of the invention where the combination of solubilizer and toughener is present:

said tougheners should in toto be included in the composition in an amount of from 5 to 40 wt. %, for example in an amount of from 10 to 25 wt. % or from 12 to 16 wt. %, based on the total weight of the composition; and, said solubilizer should be included in an amount of from 1 to 15 wt. %, based on the weight of the composition: preferably the solubilizer constitutes from 2 to 10 wt. %, for example from 3 to 7 wt. % of said composition.

These toughener quantities are preferred because quantity greater than 40% may lead to inadequate adhesion properties, whereas low quantities, mainly below 5%, may lead to inadequate debonding effect and a composition may be too flexible.

Further, these solubilizer quantities are preferred because quantity greater than 15% may adversely affect adhesion and cure properties, whereas low quantities, mainly below 1% may lead the composition being more viscose/solid, and therefore, hinder blending of the ingredients.

Electrically Conductive Particles

Either alternatively to or additionally to the presence of the aforementioned combination of solubilizer and toughener, the composition of the present invention may comprise electrically conductive particles.

The Applicant has surprisingly found out that addition of electrically conductive particles into the composition according to the present invention will allow to decrease the quantity of an electrolyte, while maintaining good debonding properties.

Broadly, there is no particular intention to limit the shape of the particles employed as conductive fillers: particles that are acicular, spherical, ellipsoidal, cylindrical, bead-like, cubic or platelet-like may be used alone or in combination. Moreover, it is envisaged that agglomerates of more than one particle type may be used. Equally, there is no particular intention to limit the size of the particles employed as conductive fillers. However, such conductive fillers will conventionally have an average volume particle size, as measured by laser diffraction/scattering methods, of from 1 to 500 µm, for example from 1 to 200 µm.

Exemplary conductive particulate fillers include, but are not limited to: silver; copper; gold; palladium; platinum; nickel; gold or silver-coated nickel; carbon black; carbon fibre; graphite; aluminium; indium tin oxide; silver coated copper; silver coated aluminium; metallic coated glass spheres; metallic coated filler; metallic coated polymers; silver coated fibre; silver coated spheres; antimony doped tin oxide; conductive nanospheres; nano silver; nano aluminium; nano copper; nano nickel; carbon nanotubes; and, mixtures thereof. The use of particulate silver and/or carbon black as the conductive filler is preferred.

In certain important embodiments, the electrically conductive particles should be included in the composition in an amount of from 0.05 to 10 wt. %, based on the total weight of the composition. Preferably the composition comprises from 0.1 to 5 wt. %, for example 0.5 to 4 wt. % or from 1 to 3 wt. % of electrically conductive fillers, based on the total weight of the composition.

These electrically conductive particles quantities are preferred because quantity greater than 10% may increase the conductivity, but at the same adversely affect adhesion and debonding properties, whereas low quantities, mainly below 0.05% may lead no physical effect, and a quantity of an electrolyte cannot be decreased.

Additives and Adjunct Ingredients

Said compositions obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives are: plasticizers; stabilizers including UV stabilizers; antioxidants; reactive diluents; drying agents; adhesion promoters; fungicides; flame retardants; rheological adjuvants; colour pigments or colour pastes; and/or optionally also, to a small extent, non-reactive diluents.

Such adjuvants and additives can be used in such combination and proportions as desired, provided they do not adversely affect the nature and essential properties of the composition. While exceptions may exist in some cases, these adjuvants and additives should not in toto comprise more than 50 wt. % of the total composition and preferably should not comprise more than 20 wt. % of the composition.

A "plasticizer" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: diurethanes; ethers of monofunctional, linear or branched C4-C16 alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential.

"Stabilizers" for purposes of this invention are to be understood as antioxidants, UV stabilizers, thermal stabilizers or hydrolysis stabilizers. Herein stabilizers may constitute in toto up to 10 wt. % or up to 5 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and, mixtures thereof.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be from 0 to 15 wt. %, for example from 0 to 5 wt. %, based on the total weight of the composition.

The presence of solvents and non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol; benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said non-reactive diluents constitute in toto less than 10 wt. %, in particular less than 5 wt. % or less than 2 wt. %, based on the total weight of the composition.

Methods and Applications

To form a composition, the above described ingredients are brought together and mixed. As is known in the art, to form one component (1K) curable compositions, the elements of the composition are brought together and homogeneously mixed under conditions which inhibit or prevent the reactive components from reacting: as would be readily comprehended by the skilled artisan, this might include mixing conditions which limit or prevent exposure to moisture, heat or irradiation or which limit or prevent the activation of a constituent latent catalyst. As such, it will often be preferred that the curative elements are not mixed by hand but are instead mixed by machine—a speed, static or dynamic mixer, for example—in pre-determined amounts under anhydrous conditions without intentional heating.

In accordance with the broadest process aspects of the present invention, the above described compositions are applied to the material layer(s) and then cured in situ. Prior to applying the compositions, it is often advisable to pre-treat the relevant surfaces to remove foreign matter there from: this step can, if applicable, facilitate the subsequent adhesion of the compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

The compositions are then applied to the preferably pre-treated, surfaces of the substrate by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray.

As noted above, the present invention provides a bonded structure comprising: a first material layer having an electrically conductive surface; and, a second material layer having an electrically conductive surface, wherein the cured debondable one-part (1K) adhesive composition as defined hereinabove and in the appended claims is disposed between said first and second material layers. To produce such a structure, the adhesive composition may be applied to at least one internal surface of the first and/or second material layer and the two layers then subsequently contacted, optionally under the application of pressure, such that the electrically debondable hot melt adhesive composition is interposed between the two layers.

It is recommended that the compositions be applied to a surface at a wet film thickness of from 10 to 500 μm. The application of thinner layers within this range is more economical and provides for a reduced likelihood of deleterious thick cured regions. However, great control must be exercised in applying thinner coatings or layers so as to avoid the formation of discontinuous cured films.

The curing of the applied compositions of the invention typically occurs at temperatures in the range of from 40° C. to 200° C., preferably from 50° C. to 190° C., and in particular from 60° C. to 180° C. The temperature that is suitable depends on the specific compounds present and the desired curing rate and can be determined in the individual case by the skilled artisan, using simple preliminary tests if necessary. Of course, curing at lower temperatures within the aforementioned ranges is advantageous as it obviates the requirement to substantially heat or cool the mixture from the usually prevailing ambient temperature. Where applicable, however, the temperature of the mixture formed from the respective elements of the one part (1K) composition may be raised above the mixing temperature and/or the application temperature using conventional means including microwave induction.

For completeness, it is noted that the present invention does not preclude the preparation of epoxy adhesives in the form of "film adhesive". A pre-polymer mixture of epoxy resins, hardener, and other desired components is applied as a coating onto plastic substrate, rolled up and stored at a sufficiently low temperature to inhibit the chemical reactions between the components. When needed, the film adhesive is removed from the low temperature environment and applied to a metal or composite part, the backing is stripped off and the assembly completed and cured in an oven or autoclave.

The present invention will be described with reference to the appended drawings in which.

Figure 1A:
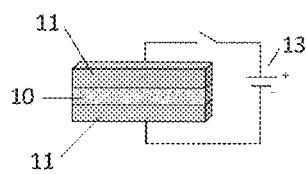
FIG. 1a illustrates a bonded structure in accordance with a first embodiment of the present invention.
Figure 1B:
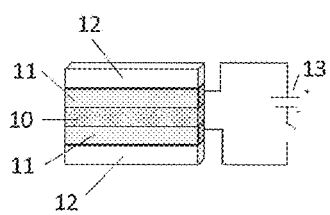
FIG. 1b illustrates a bonded structure in accordance with a second embodiment of the present invention.

As shown in FIG. 1a appended hereto, a bonded structure is provided in which a layer of cured adhesive (10) is disposed between two conductive substrates (11). A layer of non-conductive material (12) may be disposed on the conductive substrates (11) to form the more complex bonded structure as depicted in FIG. 1b. Each layer of conductive substrate (11) is in electrical contact with an electrical power source (13) which may be a battery or an AC-driven source of direct current (DC). The positive and negative terminals of that power source (13) are shown in one fixed position but the skilled artisan will of course recognize that the polarity of the system can be reversed.

The two conductive substrates (11) are shown in the form of a layer which may be constituted by inter alia: a metallic film, a metallic sheet; a metallic mesh or grid; deposited metal particles; a resinous material which is rendered conductive by virtue of conductive elements disposed therein; or, a conducting oxide layer. As exemplary conductive elements there may be mentioned silver filaments, single-walled carbon nanotubes and multi-walled carbon nanotubes. As exemplary conducting oxides there may be mentioned: doped indium oxides, such as indium tin oxide (ITO); doped zinc oxide; antimony tin oxide; cadmium stannate; and, zinc stannate. The selection of the conductive material aside, the skilled artisan will recognize that the efficacy of the debonding operation may be diminished where the conductive substrates (11) are in the form of a grid or mesh which offers limited contact with the layer of cured adhesive (10).

When an electrical voltage is applied between each conductive substrate (11), current is supplied to the adhesive composition (10) disposed there between. This induces electrochemical reactions at the interface of the substrates (11) and the adhesive composition, which electrochemical reactions are understood as oxidative at the positively charged or anodic interface and reductive at the negatively charged or cathodic interface. The reactions are considered to weaken the adhesive bond between the substrates allowing the easy removal of the debondable composition from the substrate.

Figure 2A:
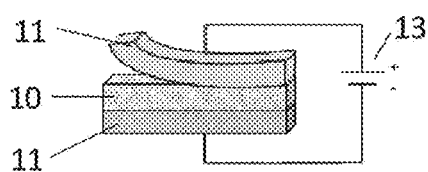
FIG. 2a illustrates the initial debonding of the structure of the first embodiment upon passage of a current across that structure.
Figure 2B:
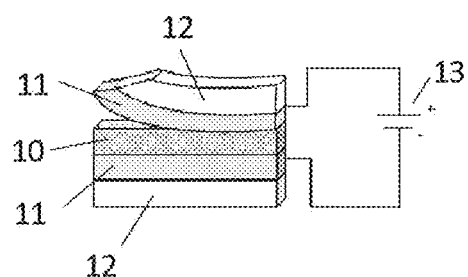
FIG. 2b illustrates the initial debonding of the structure of the second embodiment upon passage of a current across that structure.

As depicted in FIGS. 2a and 2b, the debonding occurs at the positive interface, that interface between the adhesive composition (10) and the electrically conductive surface (11) that is in electrical contact with the positive electrode. By reversing current direction prior to separation of the substrates, the adhesive bond may be weakened at both substrate interfaces.

It is however noted that the composition of the adhesive layer (10) may be moderated so that debonding occurs at either the positive or negative interface or simultaneously from both. For some embodiments, a voltage applied across both surfaces so as to form an anodic interface and a cathodic interface will cause debonding to occur simultaneously at both the anodic and cathodic adhesive/substrate interfaces. In an alternative embodiment, reversed polarity may be used to simultaneously disbond both substrate/adhesive interfaces if the composition does not respond at both interfaces to direct current. The current can be applied with any suitable waveform, provided that sufficient total time at each polarity is allowed for debonding to occur. Sinusoidal, rectangular and triangular waveforms might be appropriate in this regard and may be applied from a controlled voltage or a controlled current source. Without intention to limit the present invention, it is considered that the debonding operation may be performed effectively where at least one and preferably both of the following conditions are instigated: a) an applied voltage of from 0.5 to 200 V; and, b) the voltage being applied for a duration of from 1 second to 120 minutes, for example from 1 second to 60 minutes or from 1 second to 30 minutes. Where the release of the conductive substrate from the cured adhesive is to be facilitated by the application of a force—exerted via a weight or a spring, for instance—the potential might only need to be applied for the order of seconds. In some embodiments potential of 5V for a duration of 10 minutes is sufficient to have a debonding effect, whereas in some embodiments, potential of 3.5V for a duration of 30 minutes is sufficient.

The following examples are illustrative of the present invention and are not intended to limit the scope of the invention in any way.

EXAMPLES

The following materials were employed in the Examples:
DER 331: Liquid Epoxy Resin, reaction product of epichlorohydrin and bisphenol A, available from Olin.
DER 337: Intermediate epoxy equivalent weight semi-solid resin based on Bisphenol-A epoxy, available from Olin.
DER 337-X80: Intermediate epoxy equivalent weight semi-solid resin based on Bisphenol-A epoxy in xylene, available from Olin.
TMP: Trimethylolpropane tris (3mercaptopropionate) from sigma aldrich
Dyhard 100SH: Dicyandiamide, available from AlzChem Group AG. 1-methylimidazole: Available from BASF.
Ajicure PN—H: Epoxy-amine adduct, available from Ajinmoto.
Cab-O-Sil 720: Fumed silica which has been surface treated with polydimethylsiloxane (PDMS) available from Cabot Corporation.
Clearstrength® XT100: Core-shell toughening agent (methylmethacrylate-butadiene-styrene, MBS) available from Arkema Inc.
Aerosil R202: Fumed silica, available from Degussa.
Omyacarb 4HD: Calcium carbonate filler, available from Omya.
Luzenac 2: Talcum, available from Rio Tinto.
PM182: Premix of Epoxy (DER331), fumed silica and organic acid, available from Henkel.
Printex L: Carbon black powder in 20% DER 331, available from Orion and Cabot.
EMIM-MS: 1-Ethyl-3-methylimidazolium methansulfonate, available from TCI America Inc.
PEG400: Polyethylene glycol, available from Sigma Aldrich.
Gransurf 77 PEG-10 Dimethicone, available from Grant Industries.

Example 1

The formulation described in Table 1 hereinbelow was formed under mixing.

TABLE 1

| Ingredients | Wt. % of Composition |
| --- | --- |
| DER 331 | 26.23 |
| TMP | 19.64 |
| Omyacarb 4HD | 39.76 |
| Luzenac 2 | 4.7 |
| Aerosil R202 | 2.07 |
| Premix 182 | 0.28 |
| Ajicure PN-H | 0.85 |
| EMIM MS | 6.00 |
| Printex L | 0.47 |

The application substrate for the following Example 1 was aluminium (AA6016) having a thickness of 1 mm and Steel having a thickness 1.5 mm. The substrate was cut into samples of 2.5 cm×10 cm (1"×4") in size for tensile testing. Tensile lap shear (TLS) test was performed according to test method describe on page 4.

The applied one-part (1K) adhesive composition was cured in the overlapping region by the application of a temperature 100° C. for 30 minutes. Subsequently, the samples were stored at 25° C. with 20% humidity in a climate chamber.

Tensile lap shear strength was investigated after said 24 hour storage period both prior and subsequent to the application of a constant potential of 50V across the adhesive layer for a duration of 20 minutes. The results are documented in Table 2 herein below.

TABLE 2

| Substrate | Initial Bond Strength (MPa) | Bond Strength after 50 V, 20 minutes (MPa) |
| --- | --- | --- |
| Steel | 12.78 (±0.58) | 6.14 (±0.50) |
| Aluminium | 12.58 (±1.02) | 3.22 (±0.28) |

Figure 3A:
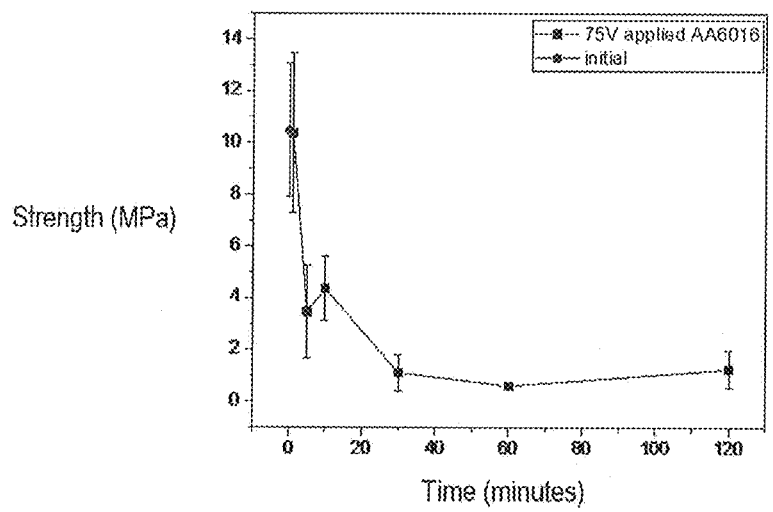
FIG. 3a illustrates the debonding effect with 75 V over time.
Figure 3B:
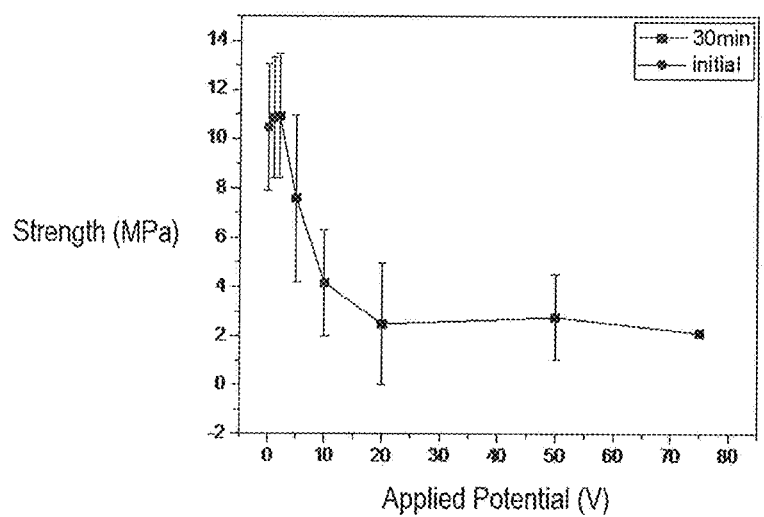
FIG. 3b illustrates the debonding with different potentials applied for 30 min.

For the adhesively bonded aluminium substrate (AA6016), lap shear strength (MPa) was investigated under two conditions: a) a constant potential (75 V) was applied across the overlapping bonded area of sample substrates for different time periods up to and including 120 minutes; and, b) different potentials were applied across the overlapping bonded region of sample substrates for a fixed period of time (30 minutes) at each applied potential. The results of these investigations are given in FIGS. 3a and 3b appended hereto.

Stability test was conducted for the composition of example 1. For this test, normal lap shear samples were prepared and cured at 100° C. for 30 min. Aluminium and steel substrates were used. Subsequently, the samples were stored at 25° C. with 20% humidity in a climate chamber.

The lap shear was measured after one day, seven days, 14 days, 28 days and 60 days. The results are documented in Table 3 herein below.

TABLE 3

| Aluminium | Initial Bond Strength (MPa) | Bond Strength after 75 V, 1 hour (MPa) |
| --- | --- | --- |
| 1 day | 12.58 (±1.0) | 3.22 (±0.3) |
| 7 days | 12.61 (±0.4) | 3.60 (±1.3) |
| 14 days | 13.03 (±1.2) | 4.97 (±1.2) |
| 28 days | 11.92 (±1.4) | 3.10 (±0.8) |
| 60 days | 13.57 (±1.0) | 4.32 (±1.1) |

Figure 4:
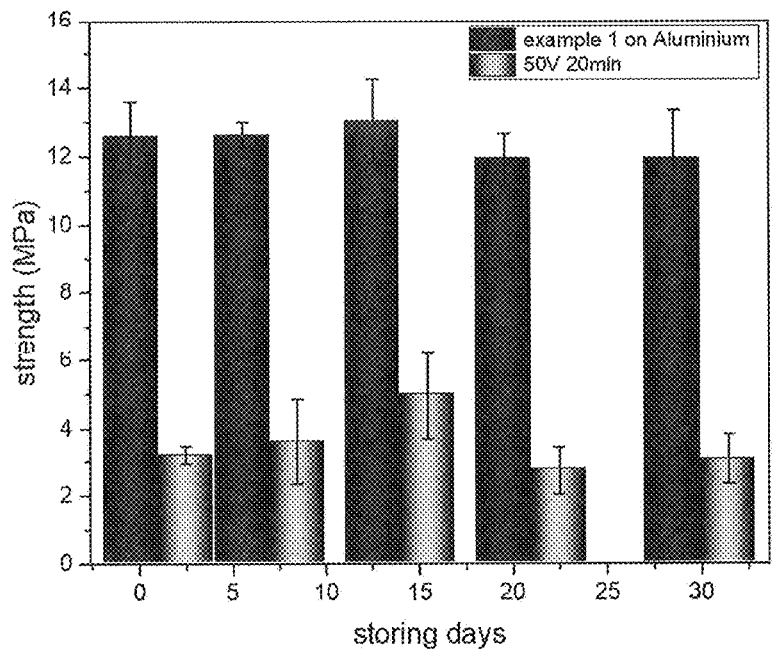
FIGS. 4, 5 and 6 illustrate stability of the compositions according to the present invention over time.

The stability results are illustrated in FIG. 4. FIG. 4 illustrates adhesion properties and debonding effect on aluminium. The test results show that the composition according to the present invention has good initial adhesion properties and does not lose them over the time. In addition, the composition according to the present invention has good initial debonding effect and maintains it over the time.

Example 2

The formulation described in Table 4 herein below was formed under mixing.

TABLE 4

| Ingredient | Wt. % of Composition |
| --- | --- |
| DER 337-X80 | 60.97 |
| Dyhard 100SH | 1.91 |
| 1-methylimidazole | 0.10 |
| EMIM-MS | 15.37 |
| PEG 400 | 4.57 |
| Gransurf 77 | 0.42 |
| Cab-o-sil TS 720 | 2.50 |
| Clearstrength XT100 | 14.17 |

The application substrate for the following Example 1 was aluminium (AA6016) having a thickness of 1.25 mm. The substrate was cut into samples of 2.5 cm×10 cm (1"×4") in size for tensile testing. Tensile lap shear (TLS) test was performed according to test method describe on page 4.

The applied one-part (1K) adhesive composition was cured in the overlapping region by the application of a temperature 180° C. for 30 minutes. The bonded structures were then stored at room temperature for 24 hours prior to initial tensile testing.

For each substrate, tensile lap shear strength was investigated after said 24-hour storage period both prior and subsequent to the application of a constant potential of 50V across the adhesive layer for a duration of 20 minutes. The results are documented in Table 5 herein below.

TABLE 5

| Substrate | Initial Bond Strength (MPa) | Bond Strength after 50 V, 20 minutes (MPa) |
| --- | --- | --- |
| Aluminium | 7.11 (±0.6) | 1.01 (±1.36) |
| Stainless Steel | 7.35 (±0.9) | 0.73 (±1.11) |

Stability test was conducted for the composition of example 2. For this test, normal lap shear samples were prepared and cured at 180° C. for 30 min. Aluminium (thickness of 1 mm) and steel (thickness of 1.5 mm) substrates were used. Subsequently, the samples were stored at 25° C. with 20% humidity in a climate chamber.

The lap shear was measured after one day, eight days, 15 days, 29 days and 50 days. The results are documented in Tables 6 and 7 herein below.

TABLE 6

| Aluminium | Initial Bond Strength (MPa) | Bond Strength after 75 V, 1 hour (MPa) |
| --- | --- | --- |
| 1 day | 8.99 (±0.52) | 2.99 (±0.91) |
| 8 days | 7.89 (±0.50) | 1.35 (±0.09) |
| 15 days | 7.86 (±0.27) | 1.41 (±0.40) |
| 29 days | 6.55 (±0.81) | 0.42 (±0.09) |
| 50 days | 6.78 (±0.86) | 0.52 (±0.06) |

TABLE 7

| Steel | Initial Bond Strength (MPa) | Bond Strength after 75 V, 1 hour (MPa) |
| --- | --- | --- |
| 1 day | 7.61 (±0.79) | 2.42 (±0.75) |
| 8 days | 7.93 (±0.67) | 2.54 (±0.90) |
| 15 days | 6.80 (±0.62) | 0.17 (±0.05) |

TABLE 7-continued

| Steel | Initial Bond Strength (MPa) | Bond Strength after 75 V, 1 hour (MPa) |
|---|---|---|
| 29 days | 5.70 (±0.23) | 0.37 (±0.05) |
| 50 days | 7.30 (±0.65) | 0.33 (±0.16) |
| 85 days | 8.23 (±0.81) | 0.22 (+0.13) |

Figure 5:
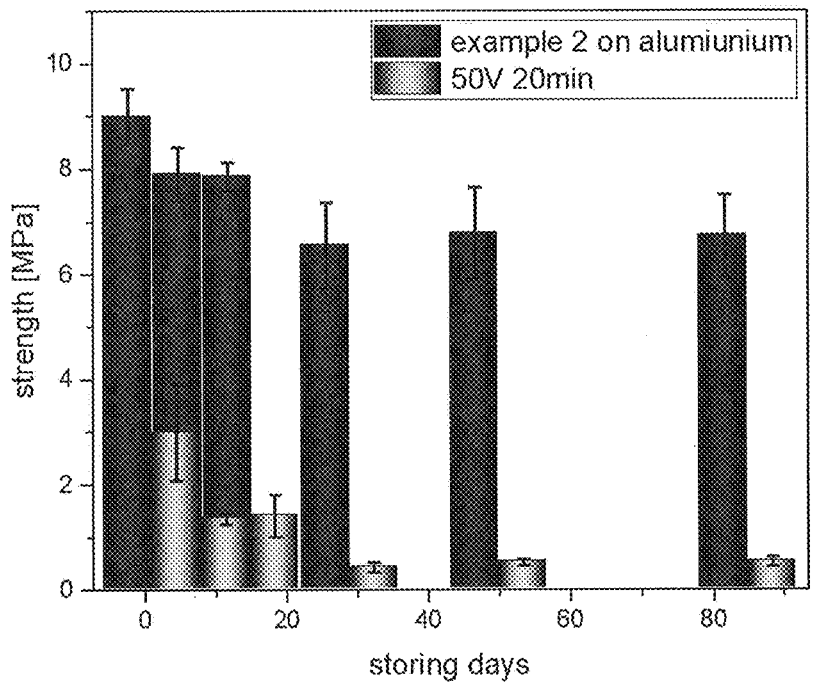
Figure 6:
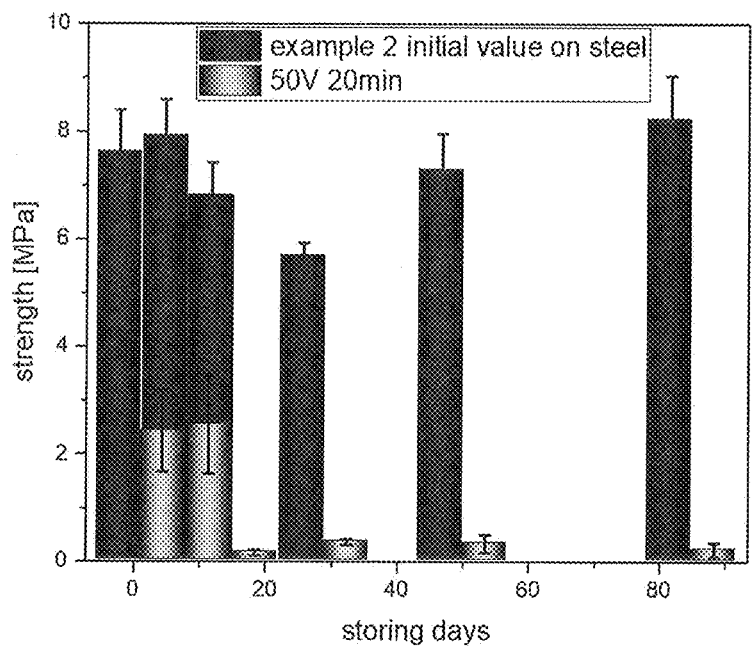

The stability results are illustrated in FIGS. 5 and 6. FIGS. 5 an 6 illustrate adhesion properties and debonding effect on aluminium. The test results show that the composition according to the present invention has good initial adhesion properties and does not lose them over the time. In addition, the composition according to the present invention has good initial debonding effect and maintains it over the time.

Example 3

The formulation described in Table 6 herein below was formed under mixing.

TABLE 6

| Ingredient | Wt. % of Composition |
|---|---|
| DER 337-X80 | 73.16 |
| Dyhard 100SH | 2.29 |
| 1-methylimidazole | 0.12 |
| PEG400 | 5.48 |
| Gransurf 77 | 0.50 |
| 1-allyl-3-methylimidazolium bis (trifluoromethylsulfonyl)imide | 18.45 |

The application substrate for the following Example 1 was aluminium (AA6016) having a thickness of 1.25 mm inch. The substrate was cut into samples of 2.5 cm×10 cm (1"×4") in size for tensile testing. Tensile lap shear (TLS) test was performed according to test method describe on page 4.

The applied one-part (1K) adhesive composition was cured in the overlapping region by the application of a temperature 180° C. for 30 minutes. Subsequently, the samples were stored at 25° C. with 20% humidity in a climate chamber.

For each substrate, tensile lap shear strength was investigated after said 24-hour storage period both prior and subsequent to the application of a constant potential of 50V across the adhesive layer for a duration of 20 minutes. The results are documented in Table 7 herein below.

TABLE 7

| Substrate | Initial Bond Strength (MPa) | Bond Strength after 50 V, 20 minutes (MPa) |
|---|---|---|
| Aluminium | 5.47 (±1.75) | 1.15 (±0.46) |

Example 4

The formulation described in Table 8 herein below was formed under mixing.

TABLE 8

| Ingredient | Wt. % of Composition |
|---|---|
| TMP | 21.80 |
| Omyacarb 4HD | 39.21 |
| Luzenac 2 | 4.87 |
| Aerosil R 202 | 2.04 |
| Premix 182 | 0.28 |
| Aijcure PN-H | 0.84 |
| Reactint Black X95AB | 2.32 |
| EMIM MS | 4.63 |
| D.E.R 337 | 24.01 |

The application substrate for the following Example 1 was aluminium (AA6016) having a thickness of 1.25 mm. The substrate was cut into samples of 2.5 cm×10 cm (1"×4") in size for tensile testing. Tensile lap shear (TLS) test was performed according to test method describe on page 4.

The applied one-part (1K) adhesive composition was cured in the overlapping region by the application of a temperature 100° C. for 30 minutes. Subsequently, the samples were stored at 25° C. with 20% humidity in a climate chamber.

For each substrate, tensile lap shear strength was investigated after said 24 hour storage period both prior and subsequent to the application of a constant potential of 50V across the adhesive layer for a duration of 20 minutes. The results are documented in Table 9 herein below.

TABLE 9

| Substrate | Initial Bond Strength (MPa) | Bond Strength after 50 V, 20 minutes (MPa) |
|---|---|---|
| Aluminium | 2.78 (±0.08) | 0.64 (±0.34) |

Example 5

The formulation described in Table 10 herein below was formed under mixing.

TABLE 10

| Ingredient | Example 5a | Example 5b | Example 5c | Example 5d | Example 5e |
|---|---|---|---|---|---|
| TMP | 20.33 | 20.97 | 20.75 | 19.71 | 19.71 |
| Omyacarb 4HD | 41.16 | 42.44 | 42.01 | 39.89 | 39.89 |
| Luzenac 2 | 4.86 | 5.01 | 4.96 | 4.71 | 4.71 |
| Aerosil R 202 | 2.14 | 2.2 | 2.18 | 2.03 | 2.03 |
| Premix 182 | 0.29 | 0.3 | 0.29 | 0.28 | 0.28 |
| Aijcure PN-H | 0.88 | 0.9 | 0.9 | 0.85 | 0.85 |
| GPX 801 (Cabot) | 0.10 | 0.1 | 0.11 | 0.1 | 0.10 |
| EMIM MS | 3.00 | 0.0 | 1.00 | 6.00 | |
| EMIM dicyanoamide | | | | | 6.00 |
| D.E.R 331 | 27.23 | 28.08 | 27.79 | 26.93 | 26.93 |

The application substrate for the following Example 1 was aluminium (AA6016) having a thickness of 1.25 mm. The substrate was cut into samples of 2.5 cm×10 cm (1"×4") in size for tensile testing. Tensile lap shear (TLS) test was performed according to test method describe on page 4.

The applied one-part (1K) adhesive composition was cured in the overlapping region by the application of a temperature 100° C. for 30 minutes. Subsequently, the samples were stored at 25° C. with 20% humidity in a climate chamber.

For each substrate, tensile lap shear strength was investigated after said 24-hour storage period both prior and subsequent to the application of a constant potential of 50V across the adhesive layer for a duration of 20 minutes. The results for example 5a are documented in Table 11 herein below and results for examples 5b-5d in Table 12 below.

TABLE 11

| Substrate | Initial Bond Strength (MPa) | Bond Strength after 50 V, 20 minutes (MPa) |
| --- | --- | --- |
| Aluminium | 15.86 (±0.62) | 2.39 (±0.1) |

TABLE 12

| Substrate Aluminium | Initial Bond Strength (MPa) | Bond Strength after 30 V, 20 minutes (MPa) |
| --- | --- | --- |
| Example 5b | 13.95 (±0.62) | |
| Example 5c | 13.66 (±1.27) | 5.08 (±2.30) |
| Example 5d | 11.35 (±1.58) | 0.27 (±0.10) |
| Example 5e | 8.91 (±0.57) | 1.99 (±0.41) |

The samples were prepared on nickel substrate and cured at 100° C. for 30 min and stored at 20% Rh 25° C. for a longer period. The results are documented in table 13 below.

TABLE 13

| Nickel Substrate | 1 day Initial bond strength (MPa) | 1 day Bond strength after 30 V 20 min (MPa) | 7 days Initial bond strength (MPa) | 7 days Bond strength after 30 V 20 min (MPa) |
| --- | --- | --- | --- | --- |
| Example 5a | 8.58 (±1.15) | 0.33 | 10.11 (±1.91) | 0.47 |

Figure 7:
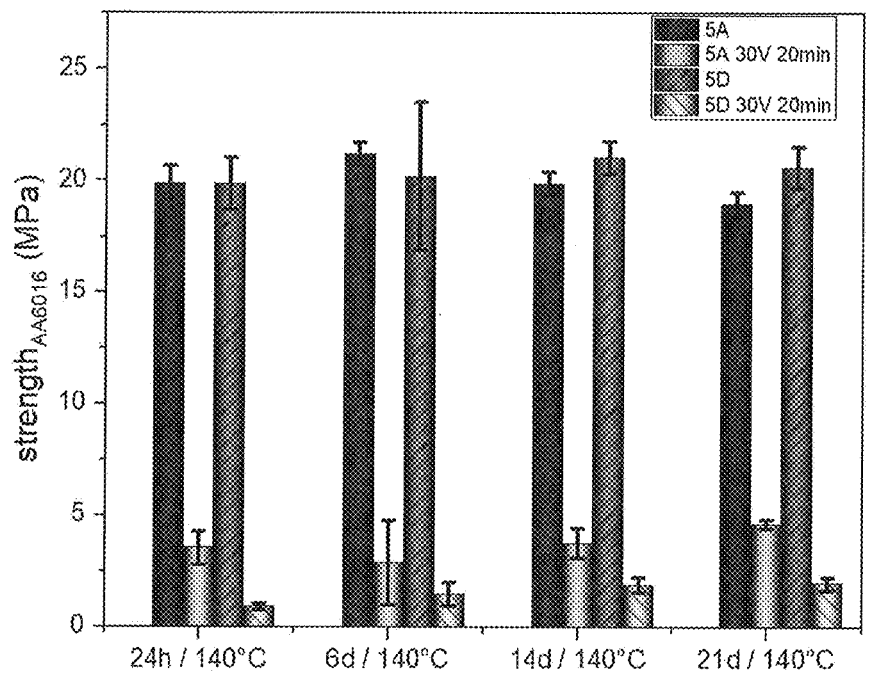
FIG. 7 illustrates a bar chart of relative strength over time at a temperature of 140° C. of Example 5a and 5d, as captured in Table 14.

The aging effect of Example 5a and Example 5d were studied. Aluminum Lap Shear Strength (LSS) samples were prepared and stored in an oven at 140° C. over a longer period. The samples were tested without applying a voltage and after applying a voltage. The table 14 below and FIG. 7 illustrate the results. It is noted that the initial strength did not change and the debonding effect stayed constant.

TABLE 14

| Storage time | Example 5a Initial bond strength (MPa) | Example 5a Bond strength after 30 V (MPa) | Example 5d Initial bond strength (MPa) | Example 5d Bond strength after 30 V (MPa) |
| --- | --- | --- | --- | --- |
| 24 h/140° C. | 19.87 (±0.77) | 3.52 (±1.15) | 19.86 (±1.15) | 0.90 (±0.14) |
| 6 d/140° C. | 21.18 (±0.53) | 2.88 (±1.87) | 20.20 (±3.31) | 1.46 (±0.51) |
| 14 d/140° C. | 19.88 (±0.50) | 3.75 (±0.67) | 21.04 (±0.72) | 1.87 (±0.34) |
| 21 d/140° C. | 18.94 (±0.53) | 4.61 (±0.19) | 20.59 (±0.92) | 1.94 (±0.28) |

Figure 8:
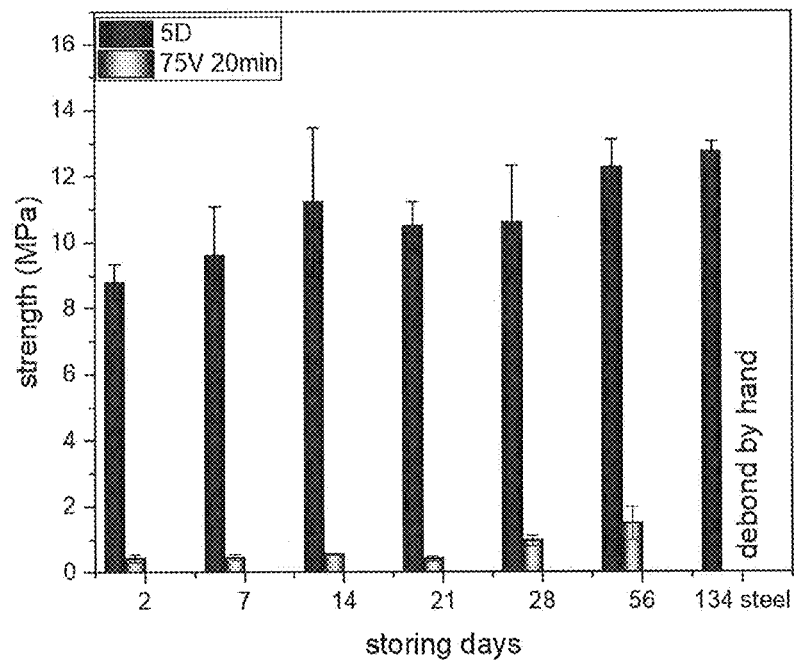
FIG. 8 illustrates a bar chart of relative strength over time at a temperature of 100° C. of Example 5d, as captured in Table 15.

The aging effect of Example 5d was also studied under different aging conditions (20% RH 25° C.). Samples were prepared on Aluminium AA 6016 and stainless steel 1.4301 and cured at 100° C. for 30 minutes. The samples were stored at 20% Rh under 25° C. for a longer period. The results are illustrated in table 15 below and FIG. 8.

TABLE 15

| Storage time | Example 5D Initial bond strength (MPa) | Example 5D Bond strength after 75 V 20 min (MPa) |
| --- | --- | --- |
| 2 d | 8.81 (±0.55) | 0.42 (±0.13) |
| 7 d | 9.63 (±1.46) | 0.44 (±0.10) |
| 14 d | 11.24 (±2.24) | 0.55 (±0.03) |
| 21 d | 10.51 (±0.72) | 0.42 (±0.08) |
| 28 d | 10.61 (±1.71) | 0.97 (±0.15) |
| 56 d | 12.28 (±0.82) | 1.48 (±0.50) |
| 134 d steel | 12.76 (±0.30) | 0.00 |

Example 6

The effect of electrically non-conductive filler was investigated in this example. Composition comprising both electrically non-conductive filler and an electrolyte (examples 6a) was compared to a composition without an electrolyte (example 6b). The composition details are in table 16 below and the results are illustrated in Table 17 below.

TABLE 16

| | Example 6a | Example 6b |
| --- | --- | --- |
| TMP | 14.71 | 20.97 |
| Omyacarb 4HD | 39.89 | 42.44 |
| Luzenac 2 | 4.71 | 5.01 |
| Aerosil R 202 | 2.07 | 2.2 |

TABLE 16-continued

| | Example 6a | Example 6b |
| --- | --- | --- |
| Premix 182 | 0.28 | 0.3 |
| Aijcure PN-H | 0.85 | 0.9 |

TABLE 16-continued

|  | Example 6a | Example 6b |
|---|---|---|
| GPX 801 (Cabot) | 0.1 | 0.1 |
| EMIM MS | 6.0 | 0.0 |
| D.E.R 331 | 26.39 | 28.08 |

TABLE 17

|  | Initial value | 30 V 20 min |
|---|---|---|
| Example 6a | 11.35 (±1.58) | 0.27 (±0.1) |
| Example 6b | 8.93 (±0.68) | 11.82 (±2.19) |

Figure 9:
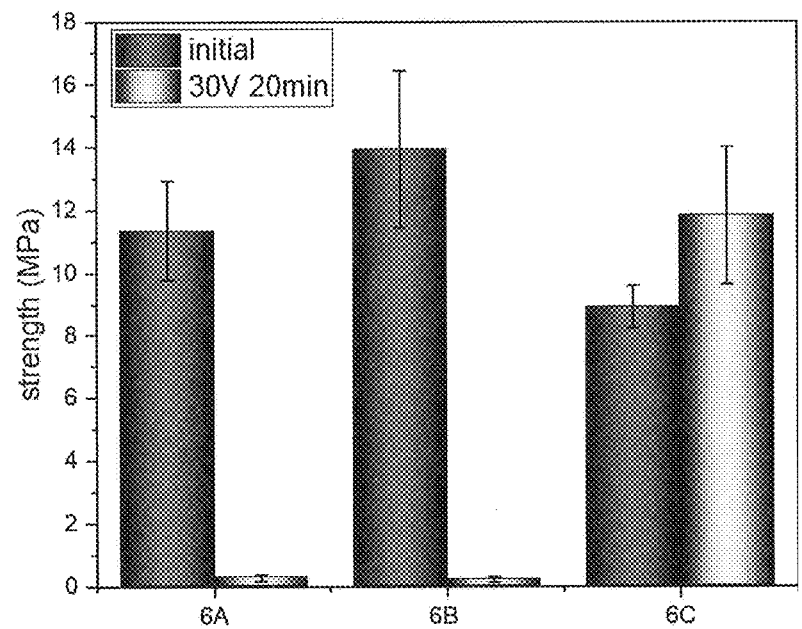
FIG. 9 illustrates a bar chart of relative strength over time at a temperature of 140° C. of Example 6a and 6b, as captured in Table 17, and of Example 6c.

The results are also illustrated in FIG. 9. Example 6b without electrolyte showed no debonding effect.

In view of the foregoing description and examples, it will be apparent to those skilled in the art that equivalent modifications thereof can be made without departing from the scope of the claims.

What is claimed is:

1. A curable and one component (1K) debondable epoxy containing adhesive composition comprising:
   a) epoxy resin;
   b) a curing agent for said epoxy resin;
   c) an electrolyte; and,
   d) an electrically non-conductive filler;
   wherein said composition comprises at least one of:
   e) a combination of a solubilizer and a toughener; and
   f) electrically conductive particles, and
   wherein said electrolyte is selected from the group consisting of 1-ethyl-3-methylimidazolium methansulfonate, 1-ethyl-3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di (2-hydroxyethyl) ammonium trifluoroaetate, N,N-dimethyl (2-hydroxyethyl) ammonium octanoate, methyltrioctylammonium bis (trifluoromethylsulfonyl) imide, N-ethyl-N-N-N-N-tetramethylguanidinium trifluoromethanesulfonate, guanidinium trifluoromethanesulfonate, 1-butyl-4-methylpyridinium bromide, 1-buthyl-3-methylpyridinium tetrafluoroborate, 1-butyl-3-hydroxymethylpyridinium ethylsulfate, 1-butyl-1-methylpyrrolidinium bis (trifluoromethylsulfonyl) imide, 1-butyl-methylpyrrolidinium tris (pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2, 3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris (pentafluoroethyl) trifluorophosphate, trihexyl (tetradecyl) phosphonium tetrafluoroborate and mixtures thereof.

2. A curable and debondable adhesive composition according to claim 1, wherein said epoxy resin is selected from the group consisting of bis-phenol A epoxy resin, bis-phenol F epoxy resin, mixture of bis-phenol A epoxy resin and bis-phenol F epoxy resin and mixtures thereof.

3. A curable and debondable adhesive composition according to claim 1, wherein said epoxy resin is present in an amount of from 15 to 75% by weight of the total weight of the composition.

4. A curable and debondable adhesive composition according to claim 1, wherein said curing agent comprises a thiol-based curing agent selected from the group consisting of tris-(3-mercaptopropionate) (TMP), pentaerythritoltetra (3-mercaptopropionate), di-pentaerythritolhexa(3-mercaptopropionate), pentaerythritoltetra(3-mercaptopropionate), tris(2-(mercaptopropionyloxy)ethyl)isocyanate and mixtures thereof.

5. A curable and debondable adhesive composition according to claim 1, wherein said curing agent comprises an amine-based curing agent, selected from the group consisting of cycloaliphatic amines, aliphatic amines, dicyanodiamides, polyether amines and mixtures thereof.

6. A curable and debondable adhesive composition according to claim 1, wherein said curing agent is present in an amount of from 0.01 to 25% by weight of the total weight of the composition.

7. A curable and debondable composition according to claim 1,
   wherein said electrolyte is selected from 1-ethyl-3-methylimidazolium methansulfonate, 1-ethyl-3-methylimidazolium methyl sulfate and mixtures thereof.

8. A curable and debondable adhesive composition according to claim 1, wherein said electrolyte is present in an amount of from 2.0 to 25% by weight of the total weight of the composition.

9. A curable and debondable adhesive composition according to claim 1, wherein said electrically non-conductive filler is selected from the group consisting of calcium carbonate, calcium oxide, talcum, fumed silica, silica, wollastonite, barium sulphate and mixtures thereof.

10. A curable and debondable adhesive composition according to claim 1, wherein said electrically non-conductive filler is present in an amount of from 1 to 50% by weight of the total weight of the composition.

11. A curable and debondable adhesive composition according to claim 1, wherein said solubilizer is selected from: polyoxyalkylene glycols; silicone surfactants; polpolyhydric alcohols; and, sugars.

12. A curable and debondable adhesive composition according to claim 1, wherein said solubilizer is present in an amount of from 1 to 15% by weight of the total weight of the composition.

13. A curable and debondable adhesive composition according to claim 1 wherein toughener is present in an amount of from 5 to 40% by weight of the total weight of the composition.

14. A curable and debondable adhesive composition according to claim 1 comprising electrically conductive particles selected from the group consisting of silver, carbon black and mixtures thereof.

15. A curable and debondable adhesive composition according to claim 1, wherein said electrically conductive particles are present in an amount of from 0.1 to 5% by weight of the total weight of the composition.

16. A bonded structure comprising
   a first material layer having an electrically conductive surface; and a second material layer having an electrically conductive surface;

wherein the curable and debondable adhesive composition according to claim 1 is disposed between the first and second material layers.

17. A method of debonding said bonded structure according to claim 16, the method comprising the steps of:
1) applying a voltage across both surfaces to form an anodic interface and a cathodic interface; and
2) debonding the surfaces.

18. A method according to the claim 17, wherein the voltage applied in step 1 is from 0.5 to 200 V.

19. A curable and debondable adhesive composition according to claim 1, wherein said amine-based curing agent is selected from polyether amines, dicyanodiamides, and mixtures thereof.

* * * * *